United States Patent
Coppersmith, III et al.

(10) Patent No.: US 10,839,578 B2
(45) Date of Patent: Nov. 17, 2020

(54) ARTIFICIAL-INTELLIGENCE ENHANCED VISUALIZATION OF NON-INVASIVE, MINIMALLY-INVASIVE AND SURGICAL AESTHETIC MEDICAL PROCEDURES

(71) Applicant: Smarter Reality, LLC, Round Rock, TX (US)

(72) Inventors: Walter Franklin Coppersmith, III, Round Rock, TX (US); Quoc Vong Tran, Austin, TX (US); Benjamin Curtis Beckham, Austin, TX (US)

(73) Assignee: Smarter Reality, LLC, Round Rock, TX (US)

( * ) Notice: Subject to any disclaimer, the term of this patent is extended or adjusted under 35 U.S.C. 154(b) by 0 days.

(21) Appl. No.: 16/274,965

(22) Filed: Feb. 13, 2019

(65) Prior Publication Data
US 2019/0251723 A1 Aug. 15, 2019

Related U.S. Application Data

(60) Provisional application No. 62/630,536, filed on Feb. 14, 2018.

(51) Int. Cl.
*G06T 11/60* (2006.01)
*G06N 3/08* (2006.01)
(Continued)

(52) U.S. Cl.
CPC .............. *G06T 11/60* (2013.01); *G06N 3/04* (2013.01); *G06N 3/084* (2013.01); *G06T 7/0012* (2013.01);
(Continued)

(58) Field of Classification Search
CPC ......... G06T 11/60; G06T 7/0012; G06T 7/70; G06T 2200/21; G06T 2207/20081;
(Continued)

(56) References Cited

U.S. PATENT DOCUMENTS

| | | | |
|---|---|---|---|
| 2008/0267483 A1* | 10/2008 | Zhan .................. | G06K 9/32 |
| | | | 382/131 |
| 2010/0329525 A1* | 12/2010 | Goodman .............. | G16H 50/20 |
| | | | 382/128 |

(Continued)

FOREIGN PATENT DOCUMENTS

| WO | WO2015017687 | * | 2/2015 | ............. A61B 34/10 |
|---|---|---|---|---|
| WO | WO2018097392 | * | 5/2018 | |

OTHER PUBLICATIONS

Lomas, Natasha, "FaceApp uses neural networks for photorealistic selfie tweaks," https://techcrunch.com/2017/02/08/faceapp-uses-neural-networks-for-photorealistic-selfie-tweaks/; Feb. 8, 2017; 12 pages; Copyright 2013-2019 Verizon Media.

(Continued)

*Primary Examiner* — Phuc N Doan
(74) *Attorney, Agent, or Firm* — Dickinson Wright, PLLC; Stephen A. Mason; Jonathan H. Harder

(57) ABSTRACT

A method includes obtaining, by a processor, an image of a patient using an imaging device, presenting the image of the patient on a display, and selecting one or more medical procedures to apply to the patient. The method further includes generating a modified image of the patient by applying the one or more medical procedures and the image of the patient as input to a machine learning model trained to output the modified image of the patient. The modified image of the patient includes one or more body region representations of the patient that are modified due to application of the one or more medical procedures to the image of the patient. The method also includes presenting the modified image of the patient on the display.

18 Claims, 15 Drawing Sheets

(51) Int. Cl.
*G06N 3/04* (2006.01)
*G06T 7/00* (2017.01)
*G06T 7/70* (2017.01)

(52) U.S. Cl.
CPC ............ *G06T 7/70* (2017.01); *G06T 2200/21* (2013.01); *G06T 2207/20081* (2013.01); *G06T 2207/20084* (2013.01); *G06T 2207/20092* (2013.01); *G06T 2207/30196* (2013.01); *G06T 2210/41* (2013.01)

(58) Field of Classification Search
CPC . G06T 2207/20084; G06T 2207/20092; G06T 2207/30196; G06T 2210/41; G06N 3/04; G06N 3/084
See application file for complete search history.

(56) References Cited

U.S. PATENT DOCUMENTS

| | | | | |
|---|---|---|---|---|
| 2012/0131507 | A1* | 5/2012 | Sparandara | G16H 10/60 715/833 |
| 2012/0299945 | A1* | 11/2012 | Aarabi | G06K 9/00281 345/589 |
| 2013/0173235 | A1* | 7/2013 | Freezer | G16H 50/50 703/2 |
| 2013/0314401 | A1* | 11/2013 | Engle | G06T 19/006 345/419 |
| 2014/0099029 | A1* | 4/2014 | Savvides | G06K 9/481 382/197 |
| 2014/0378810 | A1* | 12/2014 | Davis | A61B 5/7278 600/407 |
| 2015/0116463 | A1* | 4/2015 | Torma | H04N 13/296 348/47 |
| 2017/0020610 | A1* | 1/2017 | Slayton | A61B 34/10 |
| 2017/0027683 | A1* | 2/2017 | Douthitt | A61F 2/07 |
| 2017/0256040 | A1* | 9/2017 | Grauer | H04N 1/00196 |
| 2018/0144465 | A1* | 5/2018 | Hsieh | G06N 3/08 |
| 2018/0276883 | A1* | 9/2018 | D'Alessandro | G06T 11/60 |
| 2019/0110753 | A1* | 4/2019 | Zhang | G16H 50/20 |
| 2019/0122404 | A1* | 4/2019 | Freeman | G06K 9/4652 |

OTHER PUBLICATIONS

Wiggers, Kyle, "FaceApp uses neural networks to change your look, now available on Android," https://www.digitaltrends.com/photography/faceapp-neural-net-image-editing/; originally published Jan. 2017, Updated Feb. 16, 2017; 14 pages; Copyright 2019 Designtechnica Corporation.

* cited by examiner

ARTIFICIAL-INTELLIGENCE ENHANCED VISUALIZATION OF NON-INVASIVE, MINIMALLY-INVASIVE AND SURGICAL AESTHETIC MEDICAL PROCEDURES

CROSS-REFERENCE TO RELATED APPLICATION AND CLAIM OF PRIORITY

This application claims priority under 35 U.S.C. § 119(e) to U.S. Provisional Patent Application No. 62/630,536 filed on Feb. 14, 2018 entitled "ARTIFICIAL-INTELLIGENCE ENHANCED AUGMENTED REALITY VISUALIZATION OF NON-INVASIVE, MINIMALLY-INVASIVE AND SURGICAL AESTHETIC MEDICAL PROCEDURES." The above-identified provisional patent application is hereby incorporated by reference in its entirety.

TECHNICAL FIELD

This disclosure relates generally to enhanced visualization. More specifically, this disclosure relates to artificial-intelligence enhanced visualization of non-invasive, minimally-invasive and surgical aesthetic medical procedures.

BACKGROUND

Medical spas make up the fastest growing segment of the aesthetic medical field. "Med spas" typically perform non-invasive procedures (e.g., Cool Sculpting—a non-invasive procedure to freeze fat cells, which are destroyed and reabsorbed into the body). Currently, a non-physician/non-medical clinician explains available procedures and sells procedures to new patients. As such, patient intake often includes simple photography combined with a verbal explanation of various procedures and viewing of stock before and after image galleries. Even in the event of surgical treatments, patients generally spend most of the office time speaking with nurses, and not the physician.

SUMMARY

In general, the present disclosure provides an advanced visualization of aesthetic medical procedures. In some embodiments, artificial intelligence engines provide clinicians and patients features for visualization of a range of medical procedures, including long-term regimens and aging effects that may occur to a patient that selects the medical procedures and/or foregoes the medical procedures.

In some embodiments, a visualization tool is used to predict the expected outcomes of aesthetic medical procedures using artificial intelligence and to show these outcomes on augmented reality representations of their own face/body. One benefit of the disclosure is enhancing the explanation and/or sale of aesthetic medical procedures to potential patients during the intake and sale process.

In some embodiments, a medical practitioner (e.g., clinicians, nurses, and physicians) may use the techniques described herein while developing and planning a proposed course of aesthetic medical treatment. An aesthetic medical treatment may include one or more medical procedures that are performed in a single phase or more than one phase over a period of time. The medical practitioner may explain to the patient the proposed treatment and help them better understand the expected outcome using the visualization techniques. Patient understanding may be improved using the visualization techniques and the likelihood that the patients will undergo medical procedures to obtain the results they desire may be increased using the visualization techniques.

In some embodiments, one or more machine learning models (e.g., neural network) trained on before and after photos of patients that underwent various medical procedures. The machine learning model is capable of using this training to produce highly accurate predicted after images based on a before image of the patient and the selection of a particular course of treatment. The machine learning model may generate an after image (e.g., referred to as "a modified predicted image", "a predicted after image", "a predicted image", and/or "a modified image" herein) by modifying the before image based on the training data that may include other before images of other patients that are similar to the current patient and the resulting after images of the other patients after the medical procedure was performed.

In some embodiments, the machine learning model may be specifically trained on the before and after images of patients of a specific physician, a specific practice, a specific treatment (e.g., a name brand), and/or specific characteristics of the patient (e.g., race, age, gender, etc.). With this additional training, the machine learning model may make highly accurate predicted after images that take into consideration the data from a specific physician, a specific practice, and/or a specific treatment. In this way, the machine learning model may provide differentiated predicted after images across these categories, making the trained machine learning model more accurate.

In some embodiments, the machine learning model may receive another image of the patient when the patient was younger (e.g., referred to as "a target image" and/or "a younger target image" herein) and may predict both which treatments (e.g., one or more medical procedures) would have the most likely impact of returning the patient to the younger look, and how close the patient could get if the treatment is performed (e.g., generating after images based on the recommended treatment). A software application including one or more of these techniques that allow a user to upload current images and target younger images and view recommended medical procedures and/or modified images if the medical procedures are performed may be provided in an application store (e.g., "app store").

Another aspect of the disclosure may include enabling the patient or the medical practitioner scrolling through various medical procedures and visualizing, in real-time, how the options would impact the predicted after image. For example, the effects of the medical procedures may be layered on the after image as each medical procedure is selected. To that end, for each medical procedure that is deselected or removed, the after image of the patient may be updated in real-time, as well.

The techniques described in the present disclosure may be used for other types of procedures, such as dentistry, oral surgery, orthopedic surgery, burn treatment, hair replacement, and so forth. In such embodiments, the machine learning models may be trained using before and after images of patients having the other types of procedures performed. In some embodiments, the techniques may be used to predict whether a person has a certain type of illness by the machine learning model being trained on before and after images of people contracting the illnesses and the physical effects the illnesses cause to the appearance of the people. Other uses could include weight loss centers predicting the loss of weight, gyms predicting the building of muscle and/or weight loss, and other fitness related uses where muscle gain and/or weight loss could be tracked and demonstrated over time (e.g., eat a certain diet and perform a certain workout and the customer will get a specific result). For example, recommended workout regimens (e.g., cardio (running, walking, swimming), weight lifting (bench press, shoulder press, sit ups, etc.), etc.) may be determined and presented to the user, as well as modified predicted images of the users over time as they progress through the workout regimens. In this embodiment, the machine learning models may be trained on before and after images of users that perform specific workout regimens.

Another aspect of the disclosure may include visualizing an outcome of aesthetic medical procedures to a patient on a mobile device of the patient. Purchasing medical procedures may be costly and may entail the approval of other members of a family of which the patient is a member. In such a case, the disclosure permits the patient to access the patient visualization application via a secure webpage, share the patient visualization application via social media, or download a mobile application onto a mobile device, create an account using software of the disclosure, and obtain just images of the patient on the application. The patient can then explore on their own and in their own time different options and get the input of family members. The patient can upload a before image of their self using the patient visualization application, and the patient can select various medical procedures to apply to cause projected after images to be generated that change a representation of the patient in the before image. In some embodiments, the patient may share projected after images via social media, text messaging, and/or email to get feedback from others in their social network. Such sharing may also be done anonymously on some websites dedicated to aesthetic procedures where patients solicit feedback on different choices.

In some embodiments, the technique may include the use of a high-end smartphone or tablet loaded with the disclosed software that includes the imaging software, training materials, sales materials, and linkage to the AI machine learning model(s). In some embodiments, the AI may be hosted via a server remote from the mobile device, though various functionality is located locally on the mobile device to enhance speed and accuracy. For example, the AI may be trained via a server external to the mobile device and the predicted images may be generated on the mobile device and/or at the server. When the predicted images are generated at the server, they may be quickly transmitted to the mobile device via a network.

Another advantage of the present disclosure may include the ability to view a highly accurate predicted after image based on a selected series of medical procedures and a before image in real-time. For example, the user may upload the before image (e.g., by using the software loaded on a smartphone and the camera of the smartphone) and the software may automatically select various medical procedures and/or the user may select the medical procedures to apply, and the predicted after image may be generated and output by the trained machine learning model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1A:
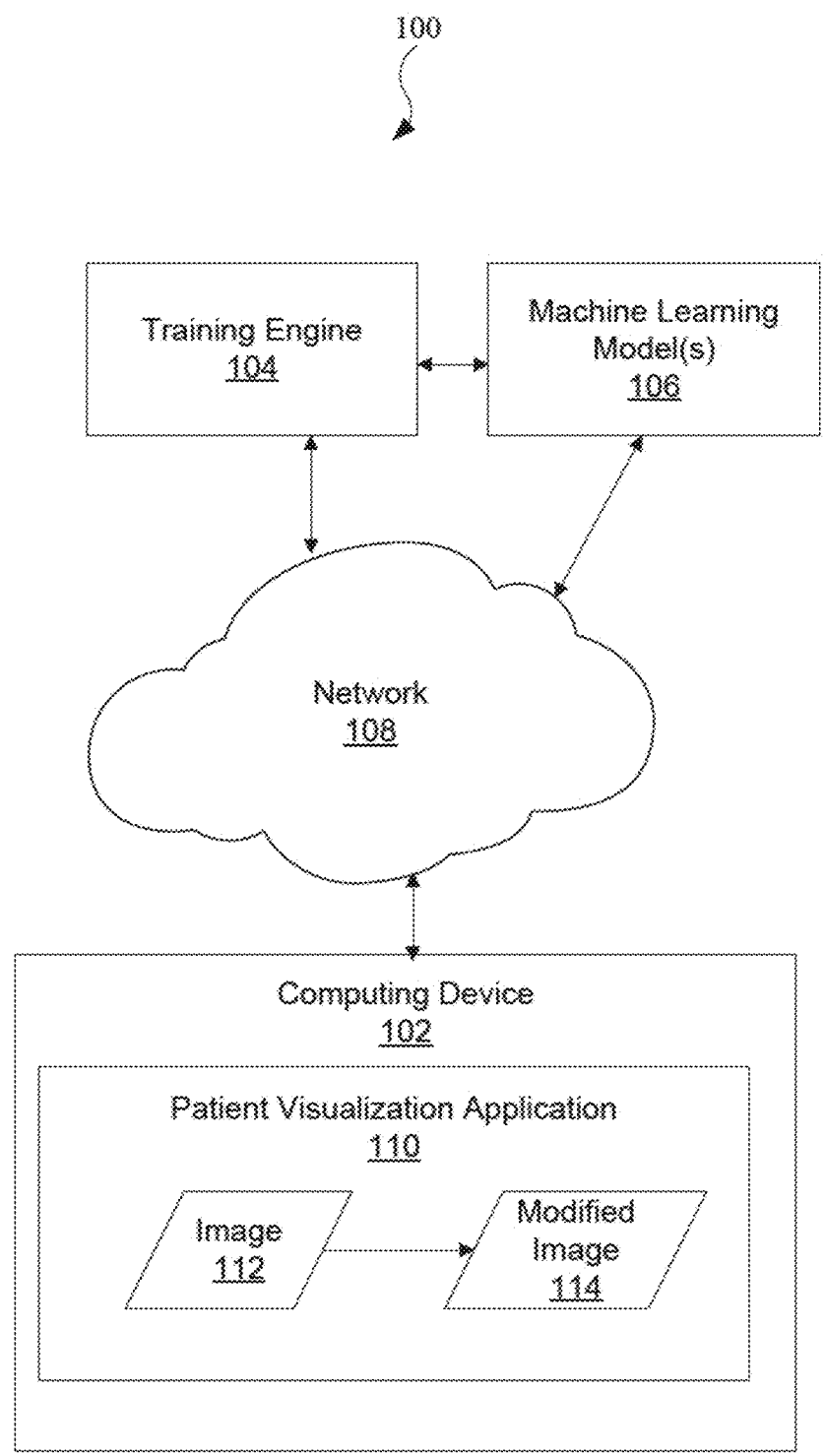
FIG. 1A illustrates a high-level component diagram of an illustrative system architecture according to certain embodiments of this disclosure.

Due to the high cost of new patient acquisition, aesthetic practitioners generally try to sell patients on long-term treatment plans and not just single sessions or procedures. To do this, patients need to have a strong sense of the benefits they will receive and see. However, conventional methods may use stock photo examples from previous patients, actors, or case studies, and do not display the actual improvement that the patient would see on themselves. Further, current digital imaging is impacted by many factors including lighting, making before/after imaging difficult to capture successfully because the changes to a patient are often subtle. Worse, patients may go into the treatment without any sense of how they will actually look once the treatment is completed.

Various means have been proposed for visualization of various aesthetic procedures. Among these include the showing of stock third-party patient before and after images. In addition, images taken of the current patient can be adjusted using image editing software. However, the changes shown via image editing software are no more than the editor's opinion as to what will change and are not entirely accurate. For example, a patient undergoing a treatment to reduce aging lines on a face may have their image adjusted using a blur tool in an image editor. While indicative of what the outcome could be, it is simply the editor's estimate and is subject to substantial deviation from the actual results. Patients are aware of this and give such estimates a low value.

A common problem associated with previous visualization systems is the failure to show the expected results a particular patient may see on themselves after a medical procedure is performed. Before/after images of previous patients—even when selected for similarities as to age, ethnicity, body type, and procedure—still fall far short of showing a patient how the procedure will impact their appearance. Also, changes based on individual procedures are often subtle; while apparent to the patient, they are not entirely obvious to third-parties at first glance. As such, when looking at images of strangers it is difficult for a patient to get an understanding of what the procedure will ultimately do on their own body.

Accordingly, aspects of the present disclosure generally relate to advanced visualization of aesthetic medical procedures to optimize the outcome and assist patients and medical practitioners in the selection and planning of medical procedures. Artificial-intelligence (AI) may be applied in multiple ways to perform various operations of the disclosed subject matter. The AI may include machine learning models, such as neural networks (e.g., deep learning networks, generative adversarial networks, convolutional neural networks, recurrent neural networks, fully connected neural networks, etc.). AI may be used to predict a range of visual outcomes (e.g., predicted images) based on a large set of training data that includes before and after images of patients (e.g., hundreds, thousands, tens of thousands, hundreds of thousands, etc.) on which medical procedures were performed. The medical procedures may include non-invasive, minimally-invasive, and surgical. The medical procedures may include Cool Sculpting, plastic surgery, tummy-tucks, liposuction, face-lift, skin grafts, and the like. There may be similar medical procedures provided by a multitude of companies that may be chosen and the effects of the medical procedures selected may be represented in the modified predicted images. The techniques may obtain a before image of a patient and select various medical procedures to apply to the patient and predict (along a scale or range) how the particular patient will respond to the treatment of medical procedures (e.g., how their appearance will change after various procedures and over time).

The AI may be used to generate a series of recommended medical procedures to help patients obtain a particular look. For example, the AI may output recommended rejuvenating procedures based on images (e.g., target images) of when the patients were younger. In other words, the patient can provide the AI with younger target images of their younger self and the AI can recommend a course of treatment and predict the outcomes of that treatment by generating predicted images of the patient that may result after the recommended treatment is performed on the patient.

In some instances, the patient may schedule and undergo the medical procedures. After the medical procedures are performed, one or more actual after images of the body region where the medical procedures were performed may be obtained. The actual after image may be compared with the modified predicted image that was generated by the one or more machine learning models. The one or more machine learning models may implement supervised learning by modifying various parameters (e.g., weights, biases, etc.) based on the comparison to enhance the accuracy of the modified predicted images.

The techniques described herein may include an image capturing system that is configured to capture consistent, light-corrected images in an automated fashion with little intervention by a clinician. The image capturing system may be aided by the use of one or more machine learning models trained to recognize optimal lighting and/or orientation conditions to obtain the images of the patients. The image capturing system may obtain before and after images that include highly consistent image properties (e.g., lighting, zoom, orientation of camera and/or patient, shading, depth of focus, etc.). Conventionally, patient images may be captured using sophisticated cameras in special rooms set aside and setup for the taking of before and after images. Before and after images are the lifeblood of an aesthetic practice. Not only are the before/after images used for obtaining new patients but also to demonstrate to patients successful treatment and visual aesthetic improvement. Given that many changes are subtle—and meant to be subtle—proper lighting and angle, as well as consistent camera use including identical filters and lenses for both the before and after image session are important.

These cameras may entail substantial training to use correctly and, in a typical aesthetic practice, turnover of clinicians is often high meaning that poorly trained individuals are taking the images. The result is that patients have successful treatments medically but are dissatisfied with their results due to poor imaging. As part of the present disclosure, the image capturing system replaces the complex hardware of the camera setup with a patient visualization application (e.g., software) that provides guidance as to lighting and angle, corrects for poor lighting and automates the taking of the photo such that the registration of the body part is aligned perfectly between each before and after image session.

As the images of the patient, both before treatment and as projected during and post treatment, are captured, the images may be presented in a variety of ways. For example, the images may be presented as three-dimensional (3D) representations on a user interface or screen. Further, the portion of the body on which the medical procedure is to be performed may be displayed as an augmented reality image in a setting in which the patient is located while the other portions of the body remain the same in the image. That is, the image may include the patient's entire body, or just the face, or juts those subject areas the patient is concerned about. In some embodiments, the patient may wear a headset that presents the modified image in full virtual reality.

The process may begin at intake of the patient. A clinician may use an imaging device (e.g., camera separate from or included in a computing device) to take one or more images of a potential patient. A patient visualization application installed on a computing device may take one or more images automatically once a patient is appropriately centered in the screen using on-screen graphical guides. The images may be rendered in either 3D (e.g., on a display screen and rotatable using an input device, such as a mouse) or in augmented reality (where the patient walks around or manipulates a digital avatar of themselves). The computing device may present the 3D representation of the patient as they are today on a display screen.

The patient visualization application, the clinician, or the patient may select from a variety of pre-set aesthetic procedures and treatment regimens and apply those to the before image. In some embodiments, treatment system providers may provide data (e.g., kind of treatment, effects of treatment, before/after images, recovery process, etc.) to use to train the one or more machine learning models specifically on that treatment system. The patient visualization application may adjust the before image in accordance with the selected medical procedure (or procedures) and render out a modified predicted image or series of modified predicted images showing the impact of the procedure(s) on the patient. These outcomes may be displayed in a range from most likely, most effective or extreme, and least effective or least extreme. In some embodiments, how "extreme" outcomes are may be provided by physicians that analyze the before and after images and provide guidance that may be input into the patient visualization system to update the one or more machine learning models. In some embodiments, the patient visualization system may prompt the patient to rate how dramatic the impact was and then compare that data to the actual before and after images. This feedback may be used to update the one or more machine learning models.

In some embodiments, the patient visualization application may present the treatment over time, such that a course of care is demonstrated (e.g., the display screen clearly shows the changes in patient appearance over time as one or more medical procedures are applied). The clinician and/or patient may then be enabled to examine the images in virtual/augmented reality and compare the images to the before image of the patient as they presently appear.

Various embodiments are configured for the explanation and sale of all types of aesthetic medical procedures to potential client-patients, including non-invasive (Cool Sculpting), minimally invasive (Botox, injectable), and surgical procedures (traditional plastic surgery). In some embodiments, the AI may predictably age the representation of the patient to produce an aged image of the patient, showing what happens if the patient does not undergo the suggested treatment. This could be done via split screen on a user interface of the patient visualization application, so that the patient can view themselves as they presently appear, as they will be as they get older, and as they could be if they undergo selected medical procedures. Similar features may show how different medical procedures may cause the patient to age (e.g., how the patient will age after such procedures).

In some embodiments, on-screen prompts provide the clinician aids in the educating of patients and in closing of sales (e.g., detailed explanations of each procedure). The patient visualization application may include training and certification features for clinicians and other medical practitioners. Integrated training and certification features permit users to self-certify during the initial installation process.

In some embodiments, the predicted images that are generated by the AI may be stored on the computing device (e.g., smartphone) and the patient visualization application may enable a patient to show the predicted images including representations of the patient after selected medical procedures are performed. For example, the patient may show the predicted images to friends and/or family. This may also include a commercial application, whereby patients take a photo of younger target images of themselves or upload the younger target images, upload a current image, and are presented predictive images and proposed list of treatments.

Further, in some embodiments, the patient may upload or select an image of another person (e.g., a celebrity), and the machine learning model may generate predicted images of how similar the appearance of the patient may be made to resemble the other person. Further, a list of medical procedures may be provided that can be performed to make the person look more like the other person. For example, the overall appearance may be predicted or just certain features (e.g., cheekbones). In some embodiments, some patients may desire to look more similar to their appearance that is altered in a filtered image. For example, a user may use a filter in a social media application and capture an image using the filter. The user may upload a before image of their current representation. The one or more machine learning models may generate a predicted image and/or list of medical procedures to perform to look more like their appearance in the filtered image.

As described further below, a system for capturing images and generating predicted images may include a computing device (e.g., a smartphone or tablet with image capture capabilities), software (e.g., the patient visualization application including the AI, imaging operations, and display operations), and/or display/video screen (e.g., tablet, computer monitor, TV). In some embodiments, the imaging device may include capabilities for collecting 3D information, as well as lighting information.

The disclosed techniques provide numerous benefits over conventional systems. For example, the patient visualization application includes various guides for capturing centered images that include consistent parameters, such as lighting, zoom, depth of focus, etc. Further, the use of the trained machine learning models may enable capturing images that include consistent lighting and/or orientation of the patient. For example, lighting conditions of the image may be manipulated to provide images with consistent lighting. Smartphones offer significant improvements in camera technologies affording consistent light conditions for images across time (e.g., for before, during, and after procedure images), as well as the projected patient results. This is a challenge for med spas using conventional techniques, because slight changes to lighting can dramatically impact images and patient satisfaction. Further, automated image capture can obviate certain aspects of human error and randomness typically caused by having different people take photos in different conditions. As such, the patient visualization application may generate more consistent photos that both improve usage by clinicians and patients, as well as increase the efficacy of the images as AI training data.

Once the predicted images are generated, the use of augmented/virtual reality may provide a patient a better sense of the final outcome of performing various medical procedures. By capturing a 3D image of the patient, especially the subject areas the patient is concerned about (e.g., love handles, face, or back), the clinician and patient can discuss in detail any patient concerns and exactly what improvements the patient is seeking. 3D image capture allows patients to see themselves from otherwise hard-to-get angles (e.g., the back). In addition, using the patient visualization application, the patient and/or clinician may select from hundreds of potential medical procedure. Clinicians experience high turnover. As such, simplifying the explanation of demonstration of various procedures using the visualization techniques provides an improvement over conventional ways.

The patient visualization application may provide a one-click selection of a medical procedure and application of the medical procedure to a representation of the patient in the before image and/or a modified predicted image that includes the effects of another selected medical procedure already. By automating the medical procedure impact to the image (e.g., before image) of the patient, the clinician and/or patient can experiment with different options in real-time, and discover the medical procedures in which the patient sees the most value. The ability of the AI to predict the outcome of medical procedures and extrapolate from younger target images may enable the patient visualization application the capability of recommending a course of treatment to change the appearance of the patient to be more similar to their younger target image. This is a significant improvement over subjective clinician and patient guesses about what will help a patient turn back the clock to a version of their former selves.

The disclosed techniques also permit layering, staging, or "stacking" of various medical procedures to demonstrate results over time and over an extended series of sessions. As an example, the patient could receive a Botox injection one day, then receive other treatments later, and the software displays the impact of these varying procedures as they are applied. The patient visualization application may include a simple effect slider on a user interface, which allows the clinician to easily show the potential range of impacts of various procedures depending on how well they "take".

The AI assisted visualization system may be easier to use for clinicians with little training. The disclosed techniques may offer better visualization of results achievable with many different medical procedures. The system may offer the ability to capture the impact of adding multiple procedures over time. Automatic application of procedures makes it easy for clinicians to explain the results of procedures with little training. Further, cutting edge smartphones and tablets offer sophisticated image capture features and displays for operation by clinicians and patients. It should be understood that any suitable imaging device and display device or processes now known or later developed may be used in accordance with the present disclosure.

The patient visualization application may be a consumer application in some embodiments. For example, the user may download the patient visualization application on their smartphone, and the user may customize their appearance by selecting medical procedures. Predicted images may be generated based on the selected medical procedures and presented to the user. Use of the patient visualization application (e.g., selected medical procedures) may be shared with treatment providers as a lead generator.

FIGS. 1A through 13, discussed below, and the various embodiments used to describe the principles of this disclosure are by way of illustration only and should not be construed in any way to limit the scope of the disclosure.

FIG. 1A illustrates a high-level component diagram of an illustrative system architecture 100 according to certain embodiments of this disclosure. In some embodiments, the system architecture 100 may include a computing device 102 communicatively coupled to a training engine 104 and/or one or more machine learning models 106 via a network 108. Network 108 may be a public network (e.g., the Internet), a private network (e.g., a local area network (LAN) or wide area network (WAN)), or a combination thereof.

The machine learning models 106 may be trained on numerous before images and after images of patients that had medical procedures performed. The medical procedures may be specific to a physician, specific practice or location, a procedure, a type of product used (e.g., Cool Sculpting), and/or specific characteristics of the patient (e.g. gender, age, race, etc.). The machine learning models 106 may learn and provide which camera settings (e.g., lighting conditions, orientation of cameras and/or patient, zoom, depth of focus, etc.) to use for taking images of a patient based on the type of medical procedure selected for the patient, the physician that will perform the medical procedure, the type of product used for the medical procedure, and so forth.

The machine learning models 106 may also be trained to generate modified predicted images of the patients in response to one or more medical procedures being performed. The one or more machine learning models 106 may be generated by the training engine 104 and may be implemented in computer instructions that are executable by one or more processing device of the training engine 104, another server, and/or the computing device 102. To generate the one or more machine learning models 106, the training engine 104 may train, test, and validate the one or more machine learning models. The training engine 104 may use a base data set of before and after images of patients having medical procedures performed and divide the base data set into three tranches so that the training, testing, and validating data are different. The training engine 104 may be a rackmount server, a router computer, a personal computer, a portable digital assistant, a smartphone, a laptop computer, a tablet computer, a camera, a video camera, a netbook, a desktop computer, a media center, or any combination of the above. The one or more machine learning models 106 may refer to model artifacts that are created by the training engine 104 using training data that includes training inputs and corresponding target outputs. The training engine 104 may find patterns in the training data that map the training input to the target output, and generate the machine learning models 106 that capture these patterns.

Back propagation may be used to send a correct answer (e.g., actual after image) and/or calculated error for each output of a layer back through the layers to improve the accuracy of the machine learning models 106. For example, a predicted image may be generated and compared to an actual after image that is obtained after the corresponding medical procedures are performed on the patient. The comparison of the actual after image and the predicted image may cause the one or more machine learning models 106 to update parameters (e.g., weights, biases, etc.) to more accurately predict images. In some embodiments, the machine learning models 106 may be generated using the before and after images of patients having medical procedures performed and another set of data (e.g., actual after images) may be used to improve the machine learning models 106 at a later time (even if all data is selected from the same base data set).

The computing device 102 may be a desktop computer, a laptop computer, a smartphone, a server, a tablet, or any suitable computing device capable of performing the techniques described herein. The computing device 102 may include one or more processing devices and one or more memory devices. The memory devices may store computer instructions that may be executed by the processing devices to perform various operations. For example, a patient visualization application 110 may be implemented in computer instructions and stored on the memory devices. The patient visualization application 110 may be executed by the processing devices to perform the operations described herein. The patient visualization application 110 may be a stand-alone application installed on the computing device 102, an application hosted by another application (e.g., a web-browser) on the computing device 102, or some combination thereof. The patient visualization application 110 may also be available on an application distribution platform ("app store") via consumer or enterprise release, or pre-installed on the computing device 102. Although depicted separately from the computing device 102, in some embodiments, the training engine 104 and/or the machine learning models 106 may reside on the computing device 102.

The computing device may also include one or more imaging devices (e.g., cameras) configured to capture images of the patient using the patient visualization application 110. The patient visualization application 110 may use one or more machine learning models 106 trained to recognize the camera settings that are applicable to certain body regions, medical procedures, physicians, and the like. In some embodiments, the patient visualization application provides on-screen graphical guide indicators on a user interface of the patient visualization application 110 displayed on a display of the computing device 102 to instruct the patient where to stand or position the imaging devices to obtain a centered image of a target region of the patient's body. The on-screen graphical guide indicators may enable automatically capturing exact image registration and orientation for before images and after images (e.g., images taken after a medical procedure is performed). A camera icon may be displayed on the user interface, as well. The on-screen graphical guide indicators and camera icon may change as the patient visualization application 110 recognizes optimal lighting, orientation conditions, zoom, and/or depth of focus. In some embodiments, the image may be automatically captured when pre-set conditions (e.g., desired lighting, orientation of cameras and/or patients, etc.) are met.

Once an image 112 (e.g., before image) of the patient is obtained, one or more machine learning models 106 may be used by the patient visualization application 110 to generate a modified image 114 of the patient that may result from performing one or more selected medical procedures on the patient. In some embodiments, the patient may upload an image of themselves at a younger age (e.g., target younger image) and the one or more machine learning models 106 may suggest various medical procedures to perform to cause the patient to look like their younger self again. The one or more machine learning models 106 may output a modified image 1114 of the patient after the suggested medical procedures are performed.

In some embodiments, the patient visualization application 110 may present numerous modified images 114 of the patient, where each modified image 114 corresponds to a certain point in time when a suggested medical procedure is performed. Further, a faded-out ("ghost-like") representation of the previous state of the patient's body region may be presented on the user interface of the patient visualization application 110, concurrently with the new state of the patient's body region, to enable the patient to see the changes that result from each medical procedure over time. The effects of the medical procedures may be stacked on the representation of the patient in the user interface as each medical procedure is simulated on the representation of the patient's body region over time.

The machine learning models 106 may include one or more of a neural network, such as an image classifier, recurrent neural network, convolutional network, generative adversarial network, a fully connected neural network, or some combination thereof, for example. In some embodiments, the machine learning models 106 may be composed of a single level of linear or non-linear operations or may include multiple levels of non-linear operations. For example, the machine learning model may include numerous layers and/or hidden layers that perform calculations (e.g., dot products) using various neurons.

In general, the use of the machine learning models 106 may begin by inputting data into the machine learning models 106 and performing several matrix operations on the input data, layer by layer. For each of the layers in the machine learning model 106, the dot product of the input may be calculated by the weights and a bias may be added. The output may be input into an activation function. The output of the activation function may be used as an input to the next layer to follow the same procedure. This process may be iterated a number of times equal to the number of layers in the machine learning model 106. The final output is the last layer ("ŷ" or "y-hat") and is a prediction. This may conclude a forward propagation process.

A calculation may be made of the difference between the prediction (y-hat) and the expected output ("y"). The value of the calculated error may be used during a backpropagation process. During backpropagation, the error is backward propagated through the layers to enable the machine learning model to learn from mistakes (e.g., the error value). By taking the derivative of the functions we used during the forward propagation process, a value for weights may be determined that enables an optimal prediction. In other words, a determination may be made of the relationship between the value of the weights and the error that resulted from those weights. After numerous epochs or iterations, the machine learning model 106 has learned to provide more accurate predictions by adapting its parameters (e.g., weights) to the provide dataset (e.g., before and after images of patients that had medical procedures performed).

Figure 1B:
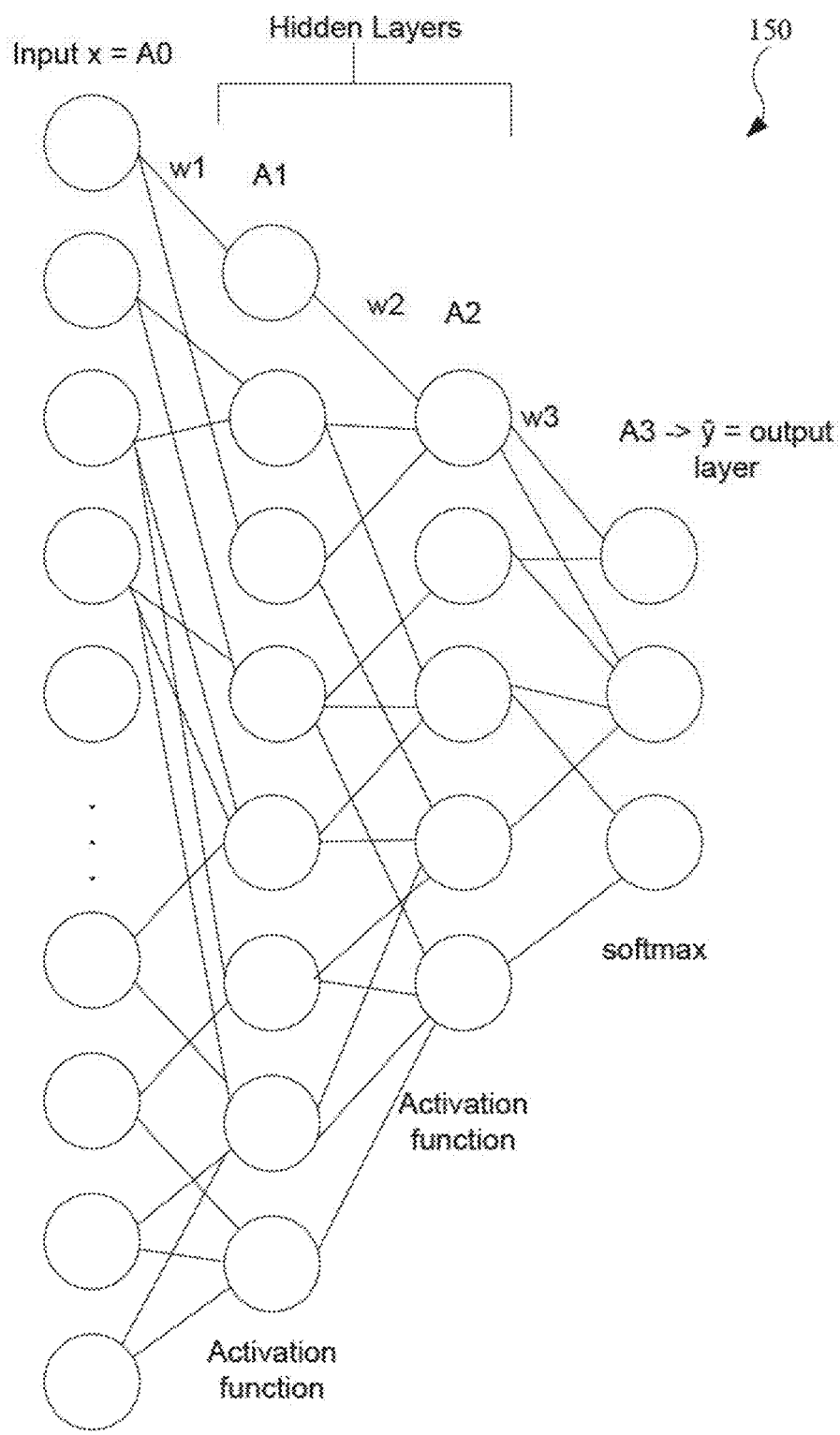
FIG. 1B illustrates an example machine learning model (e.g., a neural network) according to certain embodiments of this disclosure.

Additional details regarding the training and use of the machine learning models 106 will now be discussed with reference to FIG. 1B. The depicted example machine learning model is a neural network 150. An input layer A0 may include 178 neurons, a first layer, A1, may include 8 neurons, a second layer, A2, may include 5 neurons, and a third layer, A3, the output layer may include 3 neurons. It should be understood that any suitable number of layers including any suitable number of neurons may be used, and the depicted neural network 150 is for explanatory purposes. At a preparation step, libraries that include functions and/or operations used to train and execute the neural network 150 may be imported. Further, a dataset of the training data may be imported. The dataset may include multiple before and after images of patients that had medical procedures performed, for example. In some embodiments, the dataset is labeled for the before and after images, and the labels include a body region that was operated on, the one or more medical procedures that were performed, the physician that performed the medical procedures, the type of product used in the medical procedures, specific characteristics of the patient (e.g., gender, race, skin color, previous medical procedures performed, health information, allergies, etc.), and so forth.

At an initialization step, the training engine 104 may initialize the weights to be used by the neural network 150. In some embodiments, random or pseudo-random values between 0 and 1 may be used to initialize the weights in the neural network 150. A random number generator may be used that is takes the previous value generated as its input. When first launched, the random number generator may be seeded with a value (e.g., 0).

The training engine 104 may perform forward propagation to train the neural network 150. As discussed above, forward propagation may include determining values at each layer and comparing those values with real values to obtain the difference between output and what the values should be (e.g., obtain an error). After the weights were initialized with the random or pseudo-random numbers, the training engine 104 may advance a linear step ("z1") forward in the neural network 150. For example, the training engine 104 may take the input A0 and multiply it times the dot product of the random initialized weights plus a bias (e.g., 0). There may be three biases (bias 1, bias 2, and bias 3) added to three weight parameters (w1, w2, and w3) because the depicted neural network 150 includes three layers.

The linear step z1 may be passed through a first activation function. An activation function may convert an input signal to an output signal—and thus, an activation function may be referred to as a transfer function. The activation function may introduce non-linear properties by converting linear input to a non-linear output, thereby enabling representing more complex functions. Any suitable activation function may be used. In one example, a tan h activation function may be used for either or both layers—A1 and A2—which produces an output value between −1 and 1. Passing the linear step z1 through the activation function may create the first hidden layer A1, which may be used as input for the computation in the next activation function to produce the next linear step, z2. In some embodiments, z2 may be passed as input to the next activation function to produce the next linear step, z3.

Since there are multiple outputs in the output layer A3 (e.g., a multi-class classification problem), a function (e.g., softmax function) may be used with the output layer A3 to compute one or more probabilities for the classes by producing a value between 0 and 1. Although the softmax function is depicted as an example in FIG. 1B, it should be understood that any suitable function may be used to determine the probabilities for the classes. The classes may include modified images of what the patient will look like if one or more medical procedures are performed.

After forward propagation is complete, the training engine 104 may backward propagate the error to update the weight parameters in the neural network 150. The training engine 104 may attempt to minimize the error as much as possible to ensure the predictions are as accurate as possible. Accordingly, the training engine 104 may obtain the derivative (e.g., a slope) of a loss function with respect to the weights of the neural network 150. In one example, the derivatives may be obtained using gradient descent. The training engine 104 may use gradient descent to reduce the error by updating the weight parameters and minimizing the derivative of the loss function.

Initially, gradient descent may be used to calculate the derivative of the loss function with respect to linear step z1. Next, the derivative of the loss function with respect to weights and biases may be calculated. In some embodiments, this process may be iterated for z3, z2, z1+w3, w2, w1, and bias 3, bias 2, bias 1 by propagating backwards from the output layer A3 to the input layer A0.

To reach the optimal weight parameters and biases that produce a desired output, the training engine 104 trains the neural network 150 over numerous epochs or iterations to produce an accurate prediction. A learning rate (e.g., 0.7) may be set to control the updating of the weight parameters and the biases. The learning rate should be set to a value that enables efficient learning while producing accurate predictions.

As described above, the training data may include a dataset of before images and after images. Images may be represented as a grid of numbers that represent the darkness and/or color of each pixel. For example, the training engine 104 may treat an 18×18 pixel image as an array of 324 numbers. To enhance efficiency of training the neural network 150, various steps may be performed to enable recognize translation invariance (e.g., an object as the same object (e.g., number) no matter where the object appears in the image).

Figure 1C:
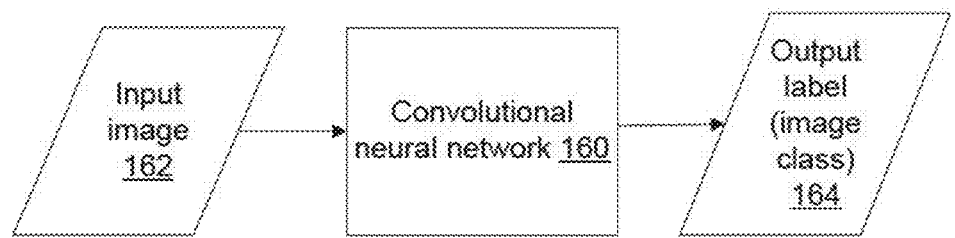
FIG. 1C illustrates another example machine learning model (e.g., a convolutional neural network) according to certain embodiments of this disclosure.

In some embodiments, a convolution operation may be performed by one or more machine learning models (e.g., convolutional neural network 160), as depicted in FIG. 1C. Convolutional neural networks 160 may perform the convolution operation to recognize objects in images. The convolutional neural network 160 may be trained similar as described above using backpropagation and/or gradient descent. An input image 162 may be input into the convolutional neural network 160, which may output an output label 164 (image class). The convolutional neural network 160 may include layers organized in three dimensions: width, height, and depth. The neurons in one layer of the convolutional neural network 160 may just be connected to a portion of neurons in the next layer. The final output of the convolutional neural network 160 may be reduced to a single vector of probability scores that are organized along the depth dimension. There are two components to the convolutional neural network 160: the hidden layers part that extracts features of an image and the classification part. The hidden layers part may perform a series of convolutions and pooling operations that detects the features of the input image 162 (e.g., detects a nose, ears, mouth, eyes, etc. of a face). The classification part may use full connected layers as a classified on top of these extracted features by outputting a probability for a predicted object based on the detected features.

Convolution may generally refer to a mathematical combination of two functions to produce a third function. Convolution may merge two sets of information. Convolution may be performed on input data with the use of a filter or kernel to produce a feature map.

An image may be divided into overlapping image tiles. For example, a sliding filter may be passed over the entire original image and a smaller image tile may be saved as a result. A stride size refers to a size of a step the filter moves each time. The stride size may be 1 such that the filter may be moved pixel by pixel over the input image 162. At every location, a matrix multiplication is performed and sums the result onto the feature map. The original image may be converted into any suitable number (e.g., 77) of equally-sized smaller image tiles. The smaller image tiles may be represented as a three-dimensional (3D) matrix with a dimension for width, height, and depth for colored images, and as a two-dimensional matrix for black and white images. Each pixel in the input image 162 is assigned a number value between 0 and 255 to represent its shade. For example, each pixel may contain 8 bits (1 byte) of information because bits are binary units and since there are 8 bits per byte, there are $2^8$ (256) possible values. For colored images, each pixel is assigned a separate value for each layer of red, green, and blue, thereby using the 3D aspect of the matrix.

Figure 1D:
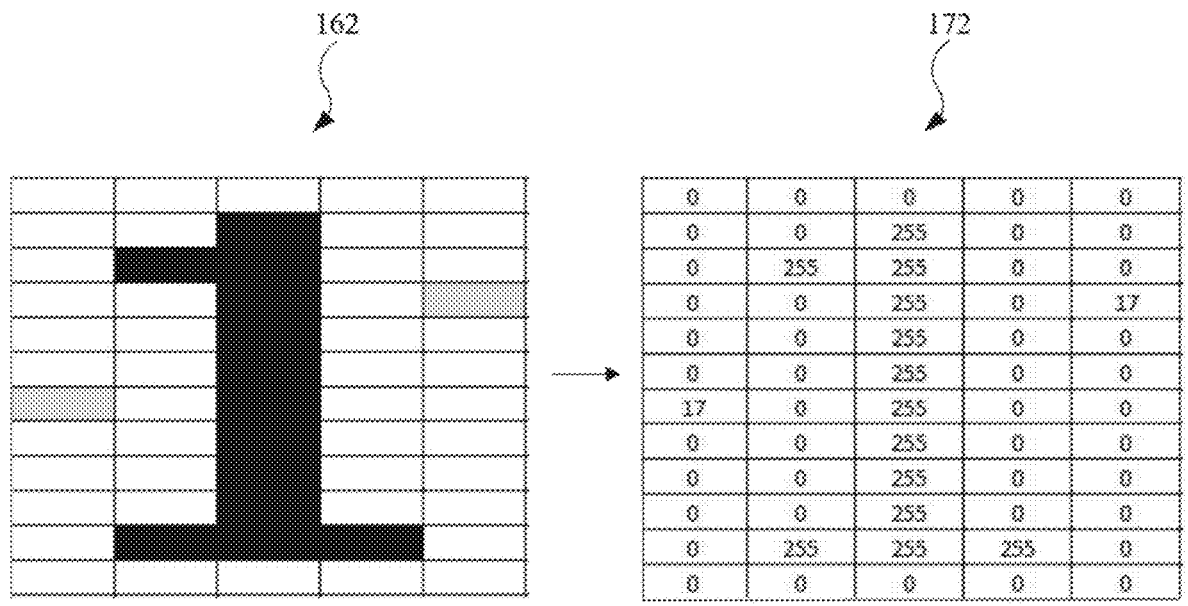
FIG. 1D illustrates an example of converting an image into an array of numbers representing the shade of color of the object in the image according to certain embodiments of this disclosure.

An example of assigning values to pixels is depicted in FIG. 1D. The input image 162 in FIG. 1D includes a black number "1", miscellaneous grey pixels, and white pixels. The portions of the image 162 that correspond to the black pixels of the number "1" are assigned the value 255, the portions that correspond to the grey pixels are assigned a value of 17, and the portions that correspond to the white pixels are assigned a value of 0. An array of numbers 172 that results from converting the pixels to corresponding values is depicted. The input image 162 is a two-dimensional black and white image and one number is assigned for the shade of color of each pixel. For a 3D colored image, each pixel is assigned a separate value for each of the red, green, and blue layers.

The smaller image tiles may be input into another machine learning model (e.g., neural network) to determine what the object in each individual smaller tile image represents. In some embodiments, the same weight parameters are maintained for each smaller tile image in the same original image to treat each smaller image tile equally. If a certain property of an object in any given smaller image tile is discovered, that smaller image tile is flagged. The results from processing the smaller image tiles using the another machine learning model are saved into a feature map in the same order as in the original image. As a result, the larger original image may be reduced to a smaller array that records which sections of the original image are flagged.

Numerous convolutions may be performed on the input image 162 to obtain multiple feature maps. The feature maps may be combined at the end to obtain the final output of the convolution layer. An activation function (e.g., ReLU activation function) may be used to make the output non-linear. In some embodiments, the resulting smaller array may be further processed to reduce the size of the smaller array, referred to as a pooling layer. The smaller array may be downsampled using a function (e.g., max pooling) that analyzes an n×n (2×2) square of the smaller array and maintains the largest number. If there was a flagged tile in the n×n feature map square, the highest number is selected to be maintained to reduce the size of the smaller array while keeping the flagged tiles having the certain properties.

The reduced smaller array may be further input into another machine learning model that determines whether the image is or is not a match. This machine learning model may be referred to as a fully connected neural network. Neurons in a fully connected network have full connections to all the activations in the previous layer. As discussed above, in addition to recognizing images, aspects of the present disclosure may include generating modified or predicted images of the patient that result from one or more medical procedures being performed to the patient.

Accordingly, one or more machine learning models may be used to generate modified images and predict which modified image includes a most accurate predicted representation of the patient. For example, a generative adversarial network (GAN) may be used as the machine learning model to implement these operations. A GAN refers to a class of deep learning algorithms including two neural networks, a generator and a discriminator, that both compete with one another to achieve a goal. For example, regarding image generation, the generator goal may include generating realistic images (e.g., modified images) including fabricated representations of a patient that the discriminator classifies as images including real representations of the patient. The discriminator goal may include distinguishing images including real representations from images including fabricated representations.

In some embodiments, the generator initially generates blank modified images and continuously generates better modified images after each iteration until the generator eventually begins to generate modified images including realistic representations of the patient. The discriminator may receive images including real representations from a dataset and the modified images including the fabricated representations generated by the generator and classifies the modified images as real or fake. The generator obtains the results from the discriminator and applies the results to generate better modified images including more realistic representations of the patient after the medical procedures are applied such that the modified images are difficult for the discriminator to classify as fabricated.

Additional details regarding the GAN are now discussed. The two neural networks, the generator and the discriminator, may be trained simultaneously. The discriminator (denoted as D(Y)) may receive an input (e.g., an image "Y") and outputs a scalar that indicates whether the image Y looks real ("natural") or not. In some embodiments, the discriminator may resemble an energy function that outputs a low value (e.g., close to 0) when image Y is a real sample (e.g., an image from a dataset) and a positive value when the image is not a real sample (e.g., if it includes noise or distortions).

The generator may be denoted as G(Z), where Z is generally a vector randomly sampled in a simple distribution (e.g., Gaussian). The role of the generator is to produce modified images so as to train the D(Y) function to output the values indicating the image is real (e.g., a low value). During training the discriminator is presented a real image and adjusts its parameters (e.g., weights and biases) to output a value indicative of the image including real representations of patients. Next, the discriminator may receive a modified image generated by the generator and adjusts its parameters to output (D(G(Z)) a value indicative of the image including fabricated representations of patients. The discriminator may use a gradient of an objective function to increase the value of the output. The discriminator may be trained as an unsupervised "density estimator", i.e., a contrast function produces a low value for desired data (e.g., images including real representations of a patient) and higher output for undesired data (e.g., images including fabricated representations of the patient). The generator may receive the gradient of the discriminator with respect to the modified image for each sample it produces. The generator uses the gradient to train itself to produce modified images that the discriminator determines include real representations of the patient by the discriminator outputting a low value, for example.

In some embodiments, the generator generates modified images that modify features of the patient by generally altering pixels (e.g., color value, number, etc.) and/or contours in an image. For example, the generator may modify extrapolate parameters (e.g., pixels and/or contours) of a younger target image and modify contours of the representation of the patient in a before image (e.g., to provide the appearance that a person is skinnier and/or change bone structure as a result of plastic surgery), change pixel color values in a before image (e.g., to provide the appearance of smooth skin), and the like, to change the appearance of the patient in the before image to more closely resemble the appearance of the patient in the younger target image.

In some embodiments, one machine learning model may be used to generate a modified predicted image of the patient in view one or more medical procedures being performed on the patient. The modified predicted image may be stored on the computing device and/or the server. The one or more medical procedures may be scheduled and performed on the patient. Then, an actual after image of the patient may be obtained using the patient visualization software. The actual after image may be compared to the modified predicted image to determine how similar the prediction is to the actual representation of the patient in the actual after image. The actual after image may be input into the machine learning model to cause one or more parameters (e.g., weights, bias) to be updated, which may be referred to as supervised learning herein. The parameters may be updated to cause the modified predicted images to be more accurate based on the actual after images that are fed into the machine learning model.

FIGS. 2-9 illustrate different user interfaces of the patient visualization application according to some embodiments. A clinician and/or a patient may use a mobile device, such as computing device 102 of FIG. 1, to execute the patient visualization application. In some instances, the clinician may use the patient visualization application to discuss potential treatments with the patient. As part of this discussion, the clinician may use the computing device and the patient visualization application to take an image of the patient that the clinician and the patient can review in detail, either on the computing device or on an accompanying display screen, such as a monitor or television. Other embodiments may include augmented and virtual reality displays of the image of the patient. The clinician and the patient may be able to review existing patient photos, including any from earlier sessions, and discuss treatment progress and compliance. During the course of the discussion, the clinician may use the one or more machine learning models to generate one or more predicted after images (modified images). These predicted after images may include what will happen if the patient receives no treatment and what will happen if different treatments (e.g., one or more medical procedures) are selected, scheduled, and performed. Multiple predicted after images can also be shown to demonstrate improvement over time as treatments take place in the case of treatments that entail multiple sessions or doses.

Figure 2:
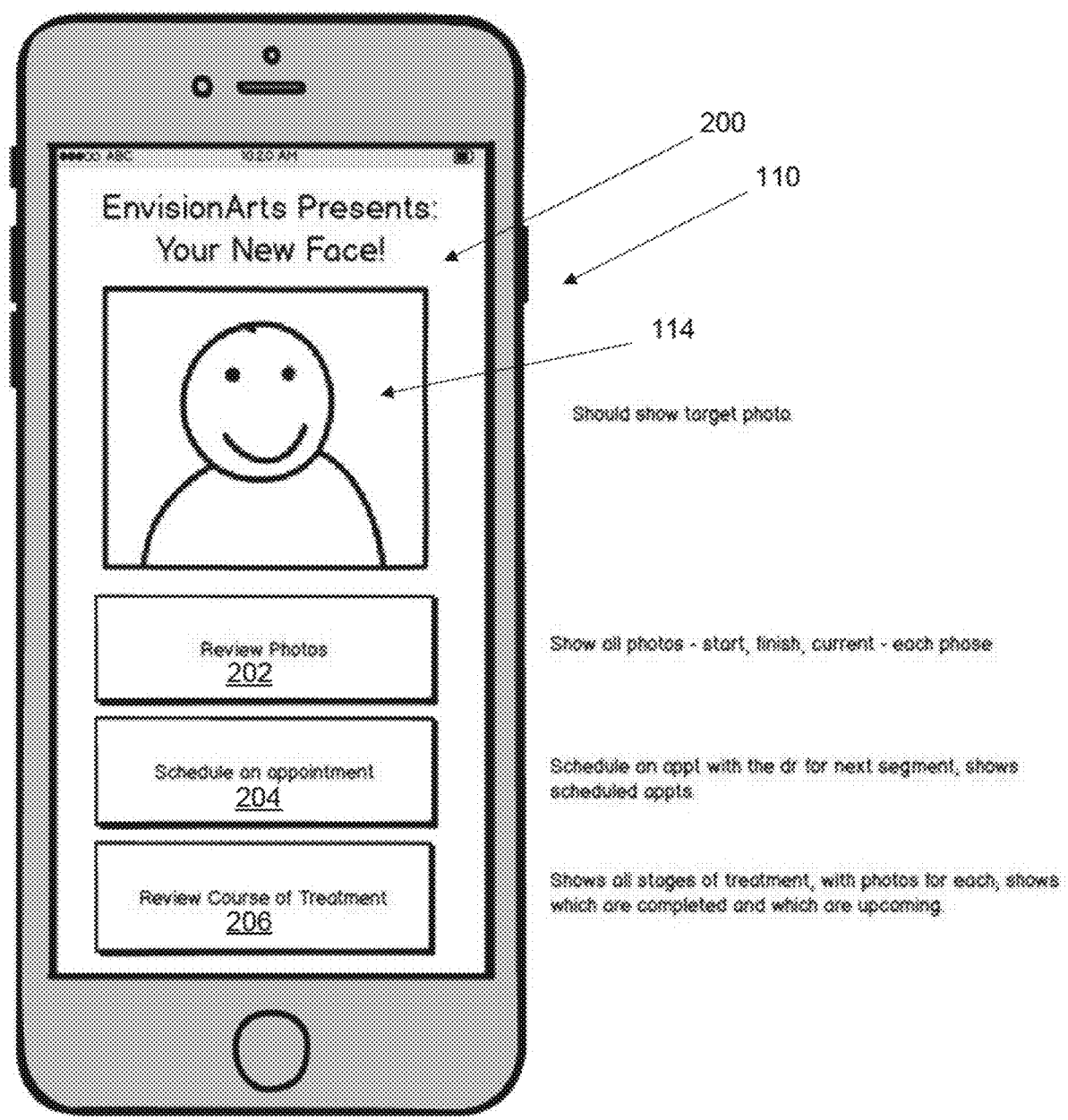
FIG. 2 illustrates an example introductory user interface of a patient visualization application according to certain embodiments of this disclosure.

FIG. 2 illustrates an example introductory user interface 200 of a patient visualization application 110 according to certain embodiments of this disclosure. The user interface 200 depicts an example home page for the patient visualization application 110. The user interface 200 presents features for patient selection and interaction, including a photo gallery review feature 202, appointment/consultation scheduling feature 204, and a course of treatment review feature 206. An avatar or modified image 114 of the patient presents the projected outcome for selected medical procedures. The photo gallery feature 202 may show before, after, and serial procedure photos and renderings for various medical procedures and/or phases of the same. The photo gallery feature 202 may also include one or more patient images that include younger representations of the patient at younger ages. The younger images may represent how the patient desires to look again and may be used by the machine learning models to select medical procedures and generate modified images of the patient based on the selected medical procedures to attempt to return the appearance of the patient to a younger age. These younger images may serve as both a benchmark and as additional targets for the machine learning models.

The appointment/consultation scheduling feature 204 may also include predicted after images abased on the stage of treatment, the time elapsed and the number of treatments obtained (e.g., not just the final patient predicted after image but intermediary stage images, as well). The appointment/consultation scheduling feature 204 may also show each appointment and/or consultation that the patient has scheduled. The course of treatment review feature 206 allows the patient and clinician to review all stages of treatment, with photos for each stage, including completed and upcoming medical procedures.

Figure 3:
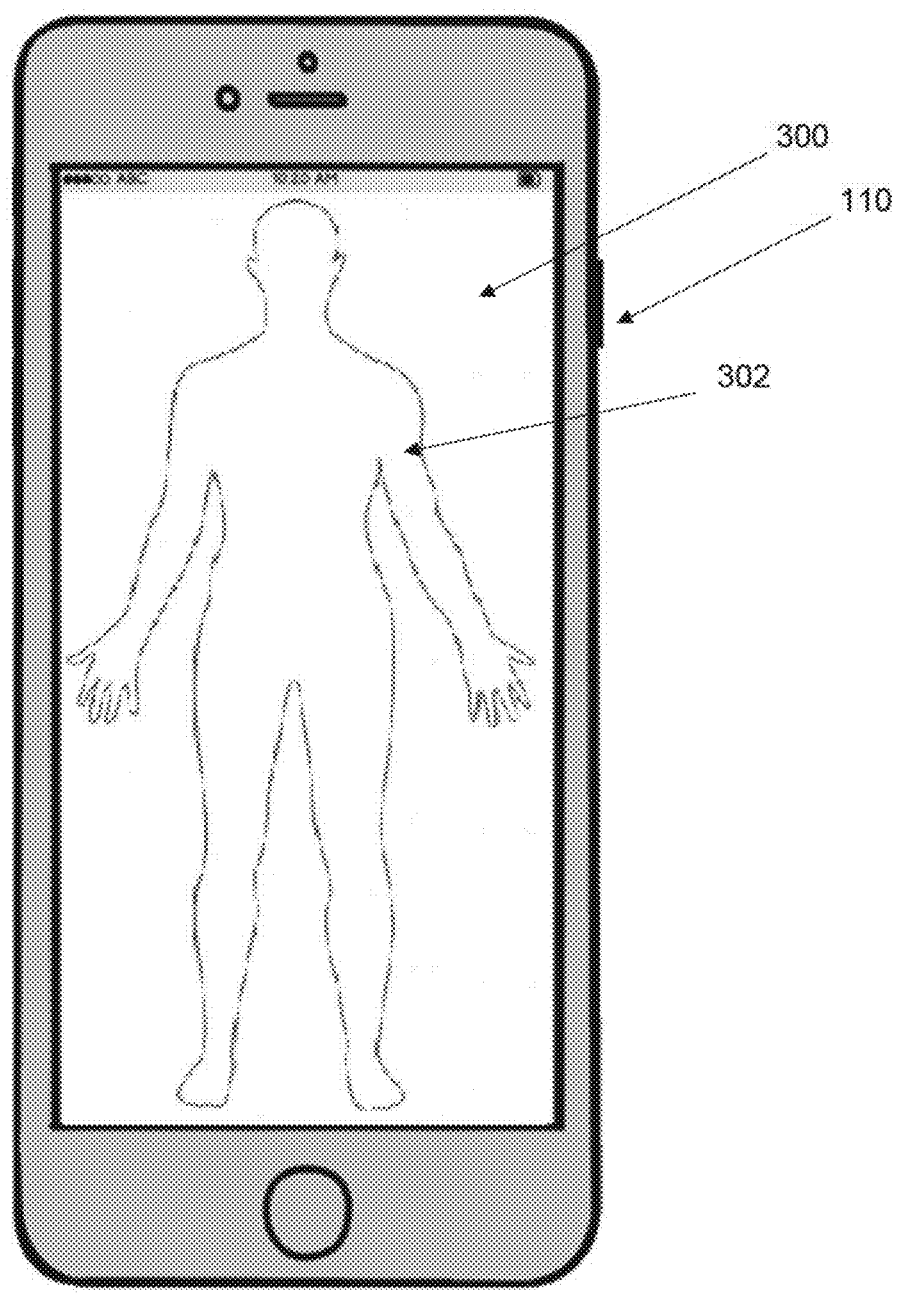
FIG. 3 illustrates an example user interface of the patient visualization application that allows the patient and/or clinician to select one or more target body regions on which medical procedures are to be applied according to certain embodiments of this disclosure.

FIG. 3 illustrates an example user interface 300 of the patient visualization application 110 that allows the patient and/or clinician to select one or more target body regions 302 on which medical procedures are to be applied according to certain embodiments of this disclosure. The patient and/or the clinician may access the user interface 300 in any suitable manner (e.g., selecting the modified image 114 on the home page, selecting to schedule an appointment, selecting a menu option to generate new modified images, etc.). In some embodiments, the patient and/or the clinician may select a target body region 302 (e.g., face, hair, abdomen, chest, inner thighs, lower back, upper back, arms, gluteal fold, etc.) on which one or more medical procedures are to be performed. The user interface 300 may include options to change the medical procedures to perform, review the photo gallery, and update user settings.

Figure 4:
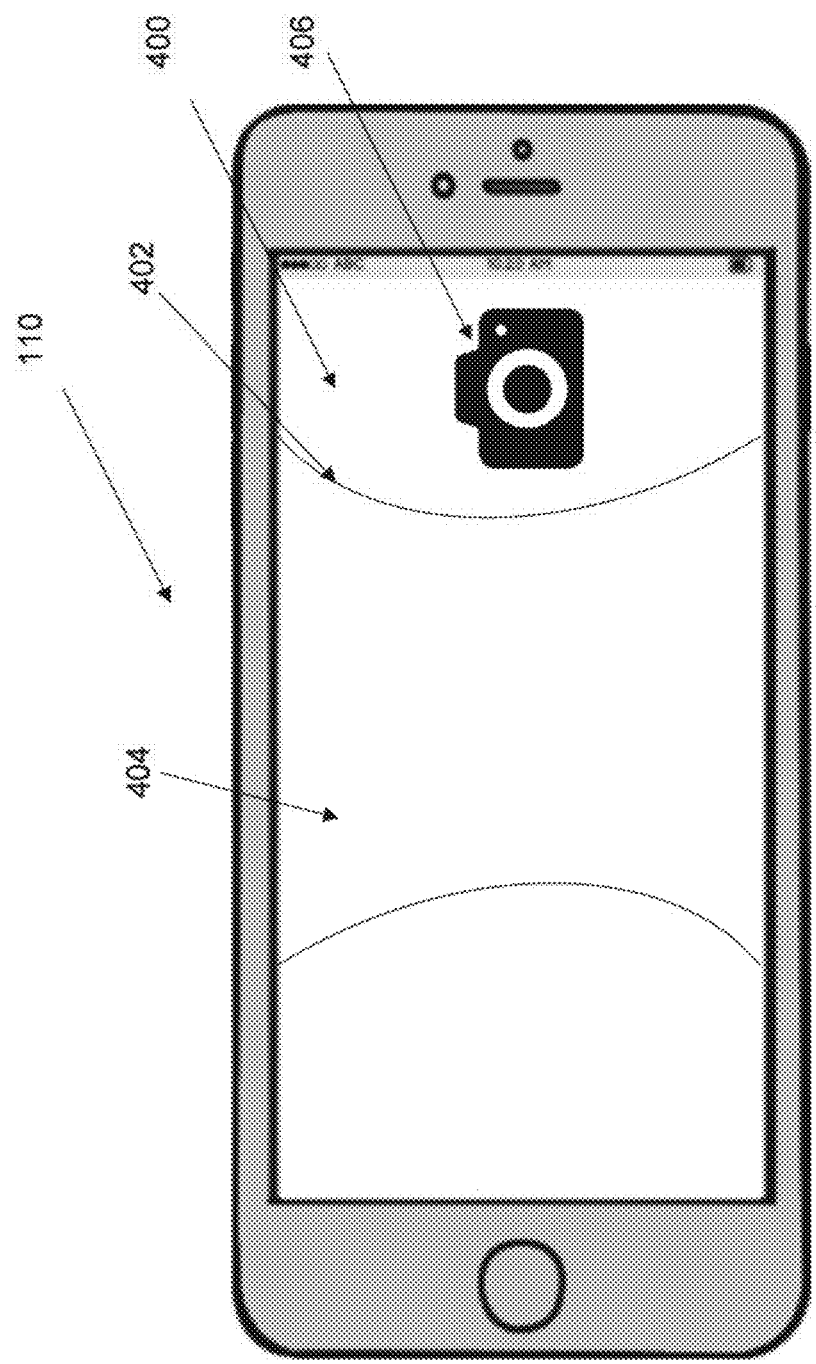
FIG. 4 illustrates an example user interface including of the patient visualization application including graphical guide indicators on the display to enable positioning the target body region of the patient within a certain image capture area of the imaging device according to certain embodiments of this disclosure.

In some embodiments, selecting the target body region and/or one or more medical procedures to perform may transition the user interface of the patient visualization application to an image capture user interface 400, as depicted in FIG. 4. The depicted image capture user interface 400 is depicted in landscape mode as an example, and it should be understood that the disclosed techniques may also be performed in portrait mode. The example user interface 400 of the patient visualization application 110 includes graphical guide indicators 402 on the display to enable positioning the target body region of the patient within a certain image capture area 404 of the imaging device of the computing device. The graphical guide indicators 402 may be dynamically tailored based on the target body region on which the medical procedures are to be performed. In the depicted example, curved lines are depicted for the graphical guide indicators 402 because the user selected to perform a medical procedure on their abdomen.

The graphical guide indicators 402 may include color coordinated alerts when the target body region is not properly aligned. For example, the graphical guide indicators 402 may appear red when the target body region is outside of the graphical guide indicators 402 and/or the lighting conditions are undesirable. The graphical guide indicators 402 may appear green when the target body region and/or the lighting conditions are within the graphical guide indicators 402. The patient visualization application 110 may use edge detection to determine when the target body region is properly aligned. As discussed above, one or more trained machine learning models may be used to determine the proper orientation of the patient and/or the imaging device to obtain the image, as well as whether the lighting conditions or any other suitable camera property (e.g., zoom, depth of focus, shading, etc.) are acceptable. In some embodiments, a camera icon 406 may illuminate a certain color (e.g., green, blue) when the machine learning models recognize optimal lighting and orientation conditions. The camera icon 406 may be greyed out or unavailable until the machine learning models recognize the optimal lighting conditions and orientation of the patient and/or imaging device. The clinician and/or the patient may select the camera icon 406 to obtain the image of the target body region of the patient.

Figure 5:
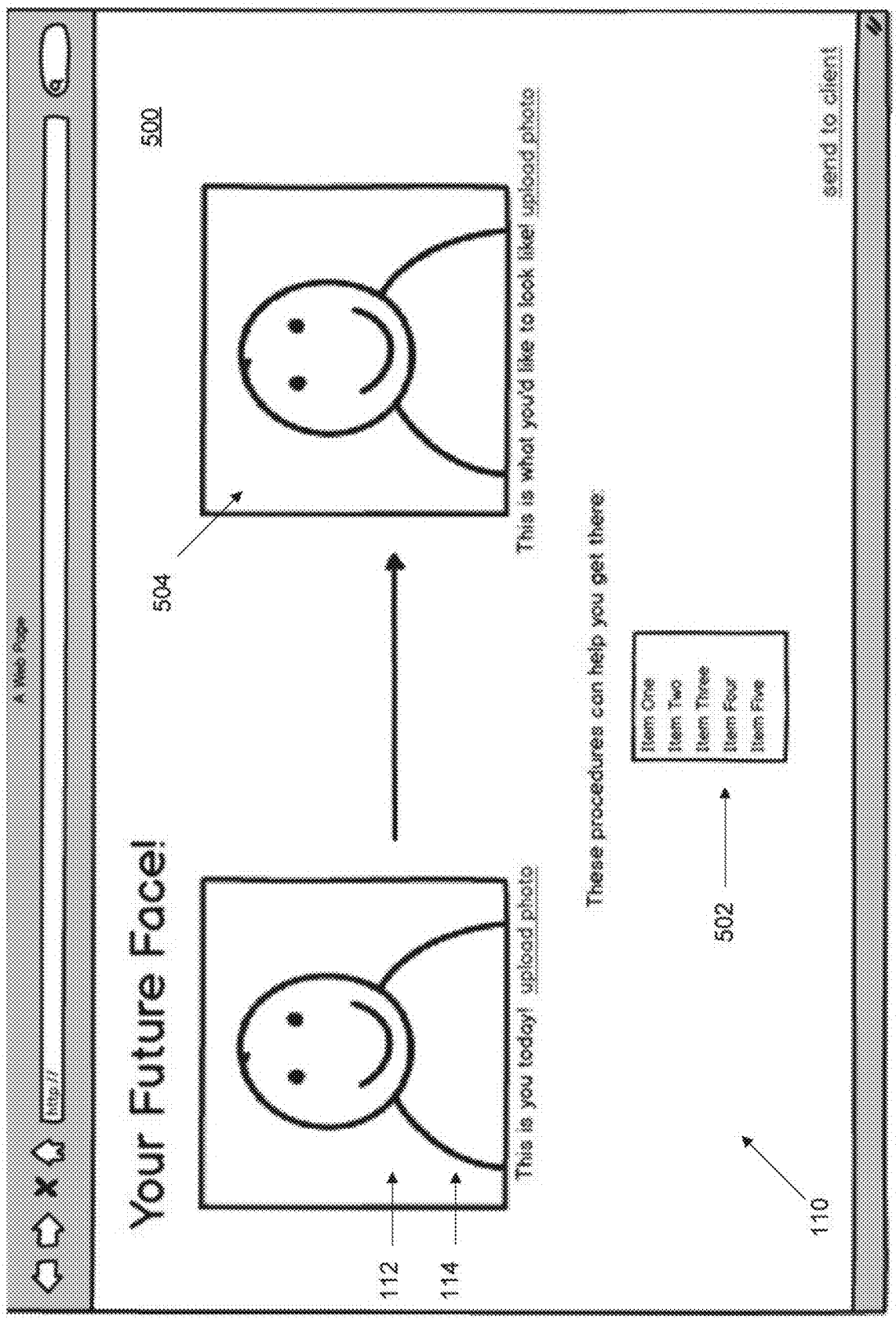
FIG. 5 illustrates an example user interface of the patient visualization application including suggested medical procedures according to certain embodiments of this disclosure.

With reference now to FIG. 5, a user interface 500 of the patient visualization application 110 including suggested medical procedures according to certain embodiments of this disclosure. In the depicted example, the user interface 500 is accessed via a webpage and not via a mobile application, although it should be understood that the user interface 500 may be accessed via a mobile application in some embodiments. The clinician may be prompted to upload or capture a current "before" image 112 of the patient. The clinician and/or patient are presented with a graphical element 502 (e.g., list, dropdown menu, etc.) of available medical procedures for selection. In some embodiments, medical procedures included in the graphical element 502 may be suggested medical procedures by the one or more machine learning models. Upon selection of one or more medical procedures, the "before" image 112 of the patient is updated to depict a representation of the patient including a predicted effect of the selected one or more medical procedures as a modified predicted image 114. This process may be repeated for any number of selected medical procedures.

In some embodiments, a younger target image 504 may be uploaded and the one or more machine learning models may recommend medical procedures to perform to achieve the younger target appearance. The medical procedures recommended may cause features of the appearance of the patient to change the representation of the patient in the before image 112 to more closely visually resemble the patient in the younger target image 504. It should be understood that patient visualization application 110 may be generally available to the public via a website or an application repository, for example. Users may use the patient visualization application 110 to upload before images or capture before images of themselves to experiment with selecting different medical procedures and visualizing how those treatments would impact their look with predicted after images. Also, the users could upload younger target images of themselves and a current before image, and the machine learning models may output a recommended list of medical procedures to make their current appearance more closely resemble their younger self and/or output a predicted modified image 114 of the patient if the medical procedures are performed.

Figure 6:
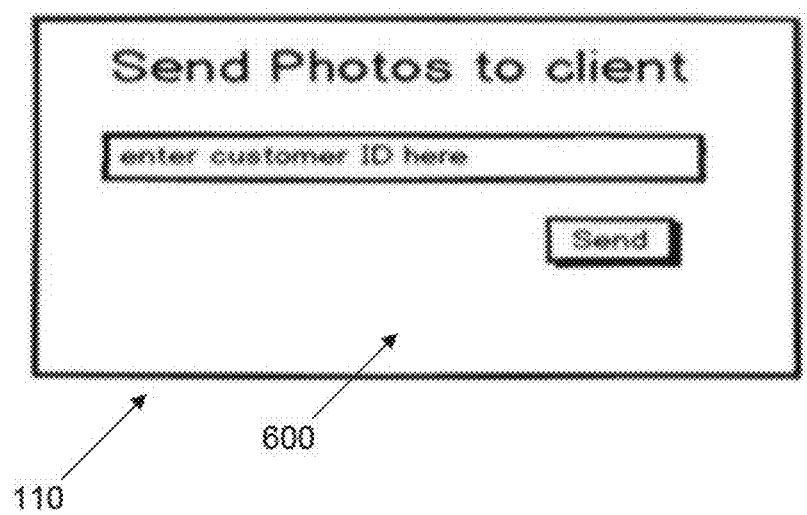
FIG. 6 illustrates an example user interface of the patient visualization application that enables sending one or more images to a patient according to certain embodiments of this disclosure.

FIG. 6 illustrates an example user interface 600 of the patient visualization application 110 that enables sending one or more images to a patient according to certain embodiments of this disclosure. The clinician may use the user interface 600 to send the before and modified images generated by the one or more machine learning models, as well as the list of medical procedures selected and simulated as being performed on the patient, to the patient. The user interface 600 may be provided in a patient portal.

Figure 7:
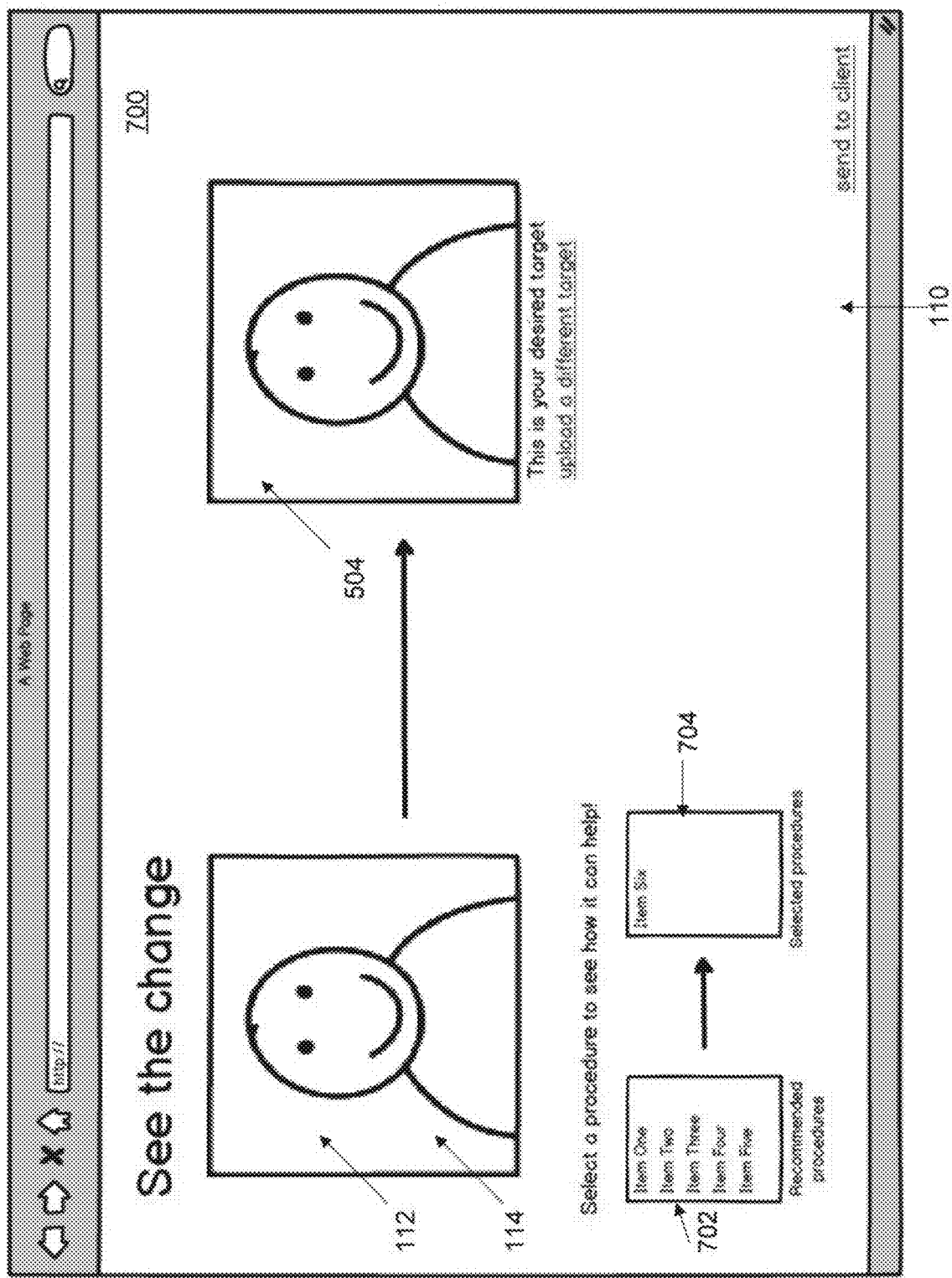
FIG. 7 illustrates an example user interface of the patient visualization application that enables configuring which medical procedures to perform on the patient and a predicted modified image of the patient after the medical procedures are performed according to certain embodiments of this disclosure.

FIG. 7 illustrates an example user interface 700 of the patient visualization application 110 that enables configuring which medical procedures to perform on the patient and a younger target image 504 of the patient after the medical procedures are performed according to certain embodiments of this disclosure. Although the example user interface 700 is depicted as a webpage of a patient portal in a web browser, it should be understood that the example user interface 700 may be provided in a stand-alone application that is downloaded and installed on a computing device. The younger target image 504 may include a representation of the patient at a younger age. As depicted, the before image 112 may be uploaded or captured by an imaging device of a computing device. The one or more machine learning models may generate recommended medical procedures for the patient based on the younger target image 504 including the younger representation of the patient and/or based on the current before image 112 of the patient. The recommended medical procedures may be presented in graphical element 702.

The patient, clinician, and/or user may use graphical element 702 to select recommended medical procedures to be added to a graphical element 704 for the selected medical procedures. Selecting the medical procedures may cause the current image 112 to be replaced with a generated modified predicted image 114, generated by the one or more machine learning models, which resembles an appearance of the patient after the selected medical procedure is performed on the patient. Selecting each of the recommended medical procedures may cause a representation of the patient in the predicted modified image 114 to resemble the younger target image 504 of the younger patient. Further, the medical procedures may be deselected or removed from the graphical element 704 to cause the predicted effect to be removed from the predicted modified image 114 (e.g., a new predicted modified image 114 is generated with the effect of the medical procedure removed).

Figure 8:
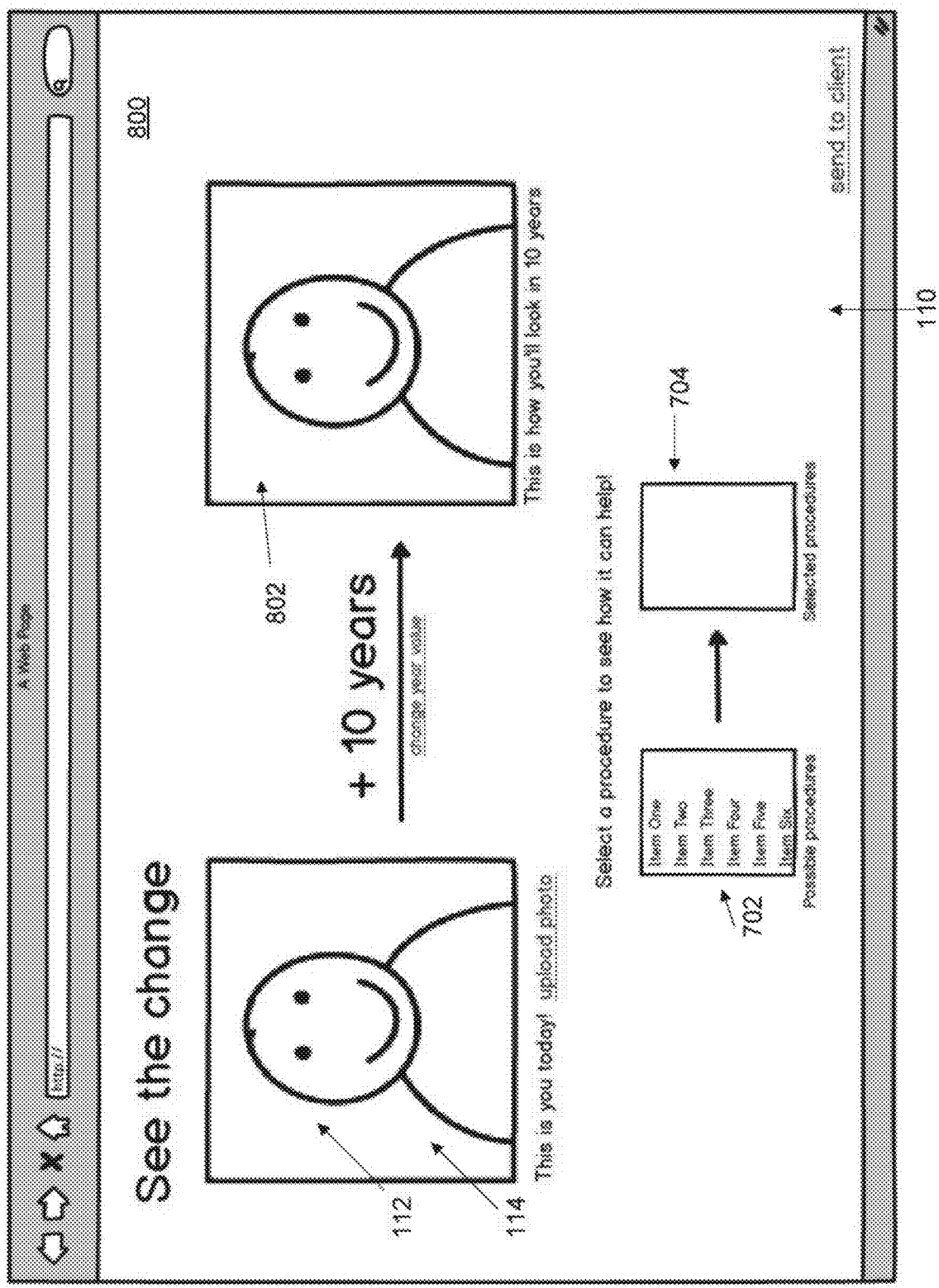
FIG. 8 illustrates an example user interface of the patient visualization application including an aged representation of the patient according to certain embodiments of this disclosure.

FIG. 8 illustrates an example user interface 800 of the patient visualization application 110 including an aged representation of the patient according to certain embodiments of this disclosure. The aged representation may be included in an aged image 802 that is generated by the one or more machine learning models based on the before image 112 of the patient. The one or more machine learning models may generate the aged image 802 of the patient to include a representation of the patient in X (e.g., 10) number of years if the medical procedures are not performed. The number of years may be configured. The graphical element 702 may be used to select medical procedures to add their predicted effect to the before image 112 of the patient. In other words, as the medical procedures are selected from the graphical element 702 and added to the graphical element 704, a modified predicted image 114 may be generated by the one or more machine learning models and replace the before image 112 on the user interface 802. Further, a modified predicted aged image may be generated by the one or more machine learning models and replace the aged image 802. The user may compare the effects of the medical procedures selected with their predicted appearance if no medical procedures are performed and if medical procedures are performed over time.

Figure 9:
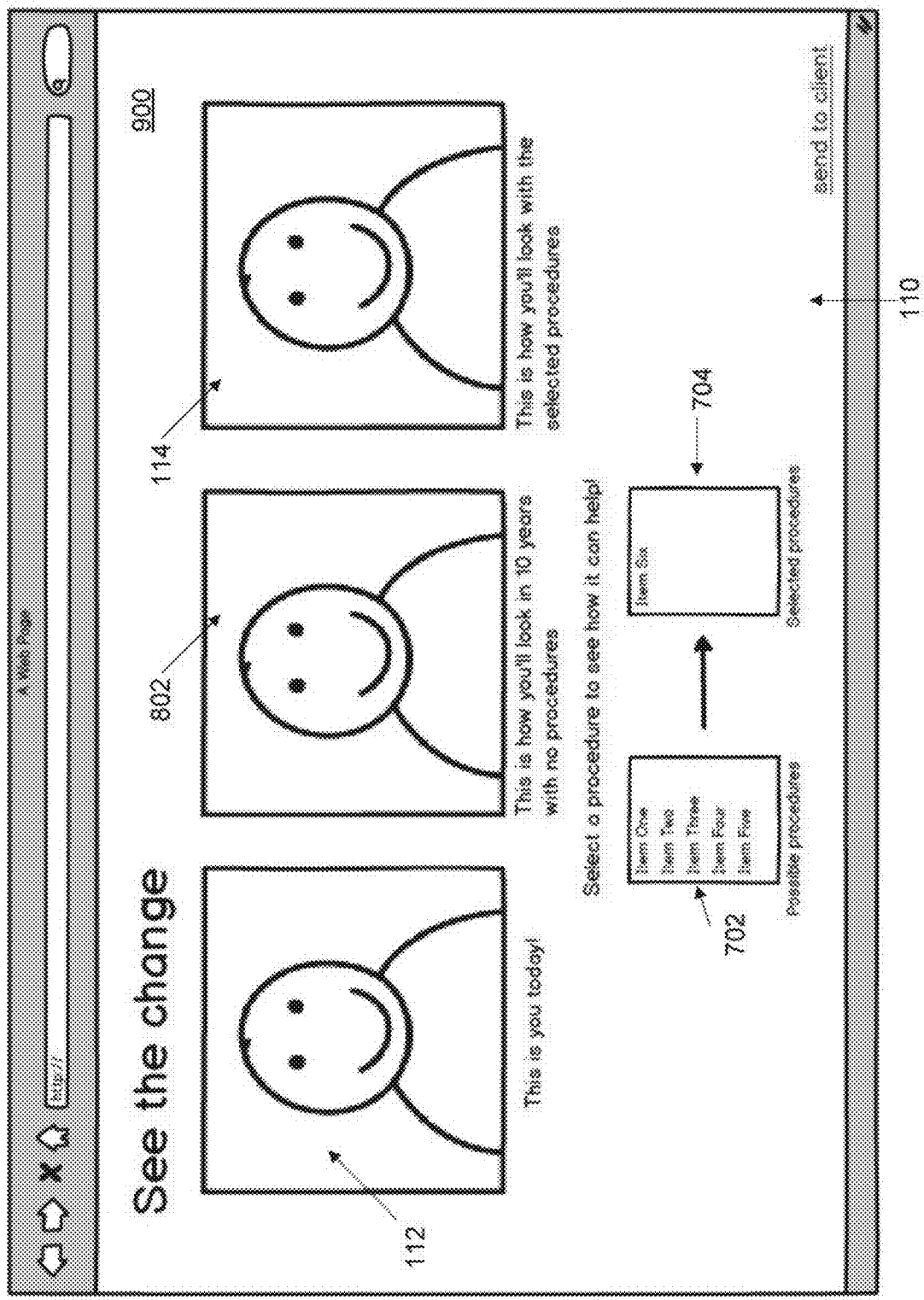
FIG. 9 illustrates an example user interface of the patient visualization application including an aged representation of the patient and a predicted image of the patient when medical procedures are performed according to certain embodiments of this disclosure.

FIG. 9 illustrates an example user interface 900 of the patient visualization application 110 including an aged representation of the patient and a predicted image 114 of the patient when medical procedures are performed according to certain embodiments of this disclosure. The aged representation may be included in the aged image 802 on the user interface 900. The user interface 900 depicts a before image 112 of a current representation of the patient, the aged image 802 of the patient in X (e.g., 10) number of years if no medical procedures are performed, and a modified predicted image 114 including a representation of the patient if one or more medical procedures are performed. The patient, clinician, and/or user may select which medical procedures to apply using the graphical elements 702 and 704. The one or more machine learning models may generate one or more modified images 114 based on the medical procedures that are selected. The effects of the medical procedures may be stacked on the representation of the patient in the modified images 114 as the patient selects additional medical procedures.

In some embodiments, a slider graphical element may be used relative to a timeline that allows the patient to move the slider along a timeline to view the effects of medical procedures that are performed over the timeline. For example, a series of medical procedures may be determined to result in the desired appearance of the patient. The medical procedures may be recommended to perform over a period of time (e.g., botox at a first time period, cool sculpting at a second time period, etc.). The patient may use the slider graphical element to scroll along the time periods of the timeline and visualize the modified images 114 that are generated by the machine learning models as a result of the individual and/or cumulative medical procedures performed. In some embodiments, the patient may adjust the order and/or timing of the medical procedures and the results of the modifications may be presented in real-time on the timeline. For example, the patient may decide to perform a medical procedure earlier than another medical procedure to obtain better visual results, based on the recovery time process, or for any suitable reason.

Figure 10:
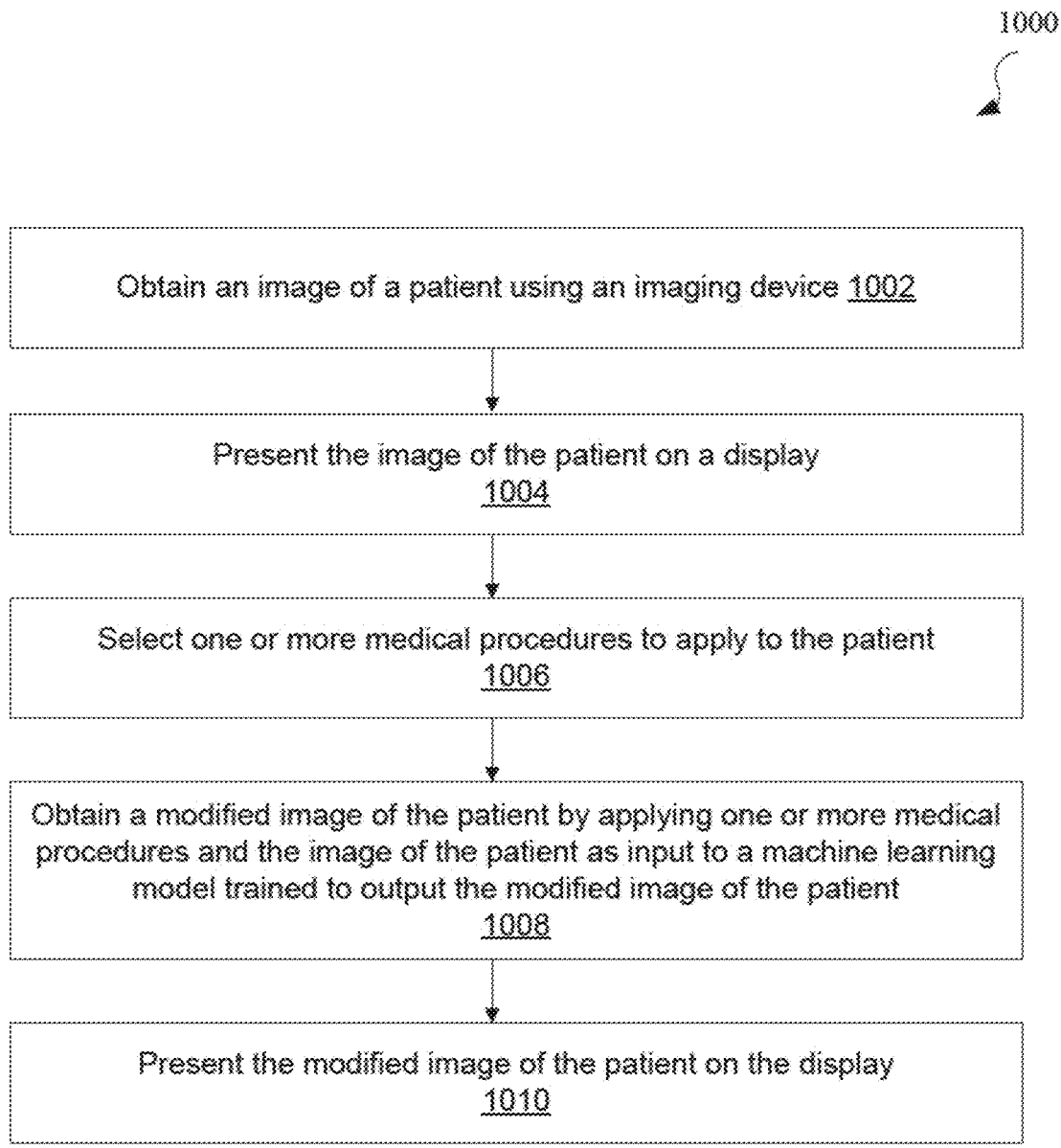
FIG. 10 illustrates example operations of a method for generating a modified image using a machine learning model according to certain embodiments of this disclosure.

FIG. 10 illustrates example operations of a method 1000 for generating a modified image using a machine learning model according to certain embodiments of this disclosure. The method 1000 may be performed by processing logic that may include hardware (circuitry, dedicated logic, etc.), software, or a combination of both. The method 400 and/or each of their individual functions, subroutines, or operations may be performed by one or more processors of a computing device (e.g., computing device 100 of FIG. 1) implementing the method 1000. The method 1000 may be implemented as computer instructions that, when executed by a processing device, execute the patient visualization system 110 and/or the machine learning models 106. In certain implementations, the method 1000 may be performed by a single processing thread. Alternatively, the method 1000 may be performed by two or more processing threads, each thread implementing one or more individual functions, routines, subroutines, or operations of the methods. Various operations of the method 1000 may be performed by the training engine 104 of FIG. 1.

In some embodiments, the one or more machine learning models used by method 1000 may include various neural networks described herein. The machine learning models may be trained, tested, and validated and enabled to generate modified predicted images of patients based on selected medical procedures to perform. In some embodiments, when additional data is gathered (e.g., actual after images), the machine learning models may be improved using supervised learning with the additional data. The machine learning models may include any suitable number of layers and may be modified over time. For example, to focus the machine learning model on a specific physician practice, physician, medical procedure, etc. additional layers may be added to the machine learning model.

At block 1002, a processing device may obtain an image (e.g., before image) of a patient using an imaging device. The image may include a current representation of the patient. The imaging device may be a component of the computing device. The patient visualization application executing on the computing device may provide a user interface including a representation of a human body. Obtaining the image of the patient using the imaging device may include receiving a selection of a target body region on which to perform one or more medical procedures. The processing device may adjust one or more image parameters including at least one or more of lighting, shading, orientation, depth of focus, or zoom based on an environment in which the patient is located. The image parameters may be recognized and/or output by the one or more trained machine learning models.

In some embodiments, the processing device may provide one or more graphical guide indicators on the display of the computing device to enable positioning the target body region of the patient within a certain image capture area of the imaging device. The processing device and/or machine learning models may determine whether the target body region is positioned within the certain image capture area of the imaging device. Responsive to determining that the target body region is positioned within the certain image capture area of the imaging device, the processing device may obtain the image of the target body region of the patient within the certain image capture area using the one or more image parameters. This image may be referred to as a before image, and similar techniques may be used by the processing device to obtain after images of the patient.

At block 1004, the processing device may present the image of the patient on the display of the computing device. At block 1006, the processing device may select one or more medical procedures to apply to the patient. For example, the medical procedure may be selected when the user chose the target body region on which to perform the medical procedure. In some embodiments, when a user uploads a younger target image of their self, the one or more machine learning models may select medical procedures that cause a representation of the user in their before image to more closely resemble the younger representation of the patient in the younger target image.

At block 1008, the processing device may obtain a modified image of the patient by applying the one or more medical procedures and the image of the patient as input to a machine learning model trained to output the modified image of the patient. The modified image of the patient may include one or more body region representations of the patient that are modified due to application of the one or more medical procedures to the before image of the patient. As discussed above, the machine learning model may include one or more neural networks, such as those used in generative adversarial networks. The machine learning model may be trained using a set of before images of a set of patients and a set of after images of the set of patients. The before images of the set of patients include representations of the set of patients before the one or more medical procedures are performed on the patient and after images of the set of patients includes representations of the set of patients after at least one of the one or more medical procedures was performed on the plurality of patients.

In some embodiments, the image and the modified image of the patient may be presented in augmented reality on the display or in virtual reality in a headset including the display. A graphical element may be present on a user interface including the before image and/or the modified image. Selection of the graphical element may cause the before image and/or the modified image to be updated with subsequent medical procedures over time. For example, the effects of each respective medical procedure may be stacked on the before image and/or modified image as the respective medical procedure is selected to be performed on the patient over time. An outline of a previous representation of the patient may be still visible on before image and/or the modified image after the effects of performing the medical procedure are implemented to enable the user to view the differences caused by the medical procedure.

In some embodiments, the processing device may receive a second image of the patient, where the second image includes a representation of the patient at a younger age than an age of the patient when the image was obtained. The second image may be referred to as a target younger image. The processing device may apply the image of the patient and the second image of the patient as input to the machine learning model trained to output one or more suggested medical procedures to perform to modify an appearance of the patient in the image to appear similar to an appearance of the patient in the second image (target younger image). Also, the processing device may apply the one or more suggest medical procedures and the image of the patient as input to the machine learning model trained to output a predicted image of the patient that results from performing the one or more medical procedures on the appearance of the patient in the image. The processing device may present the one or more suggested medical procedures and the predicted image of the patient on the display of the computing device.

Figure 11:
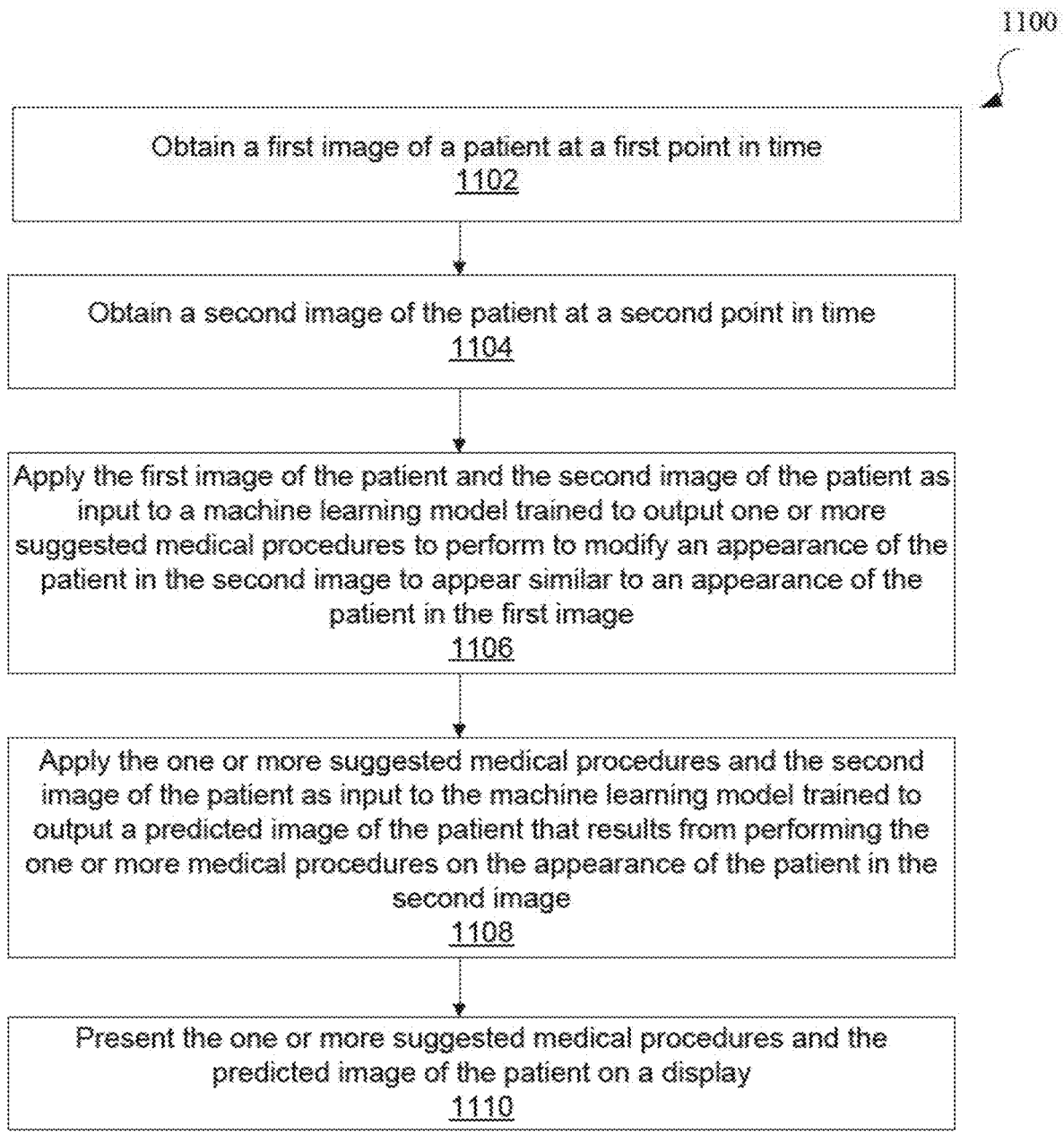
FIG. 11 illustrates example operations of a method for generating a modified image based on an image of a patient at a younger age according to certain embodiments of this disclosure.

FIG. 11 illustrates example operations of a method 1100 for generating a modified image based on an image of a patient at a younger age according to certain embodiments of this disclosure. Method 1100 includes operations performed by processing devices of the computing device 102 and/or the training engine 104 of FIG. 1. In some embodiments, one or more operations of the method 1100 are implemented in computer instructions that, when executed by a processing device, execute the patient visualization application and/or the machine learning models. The method 1100 may be performed in the same or a similar manner as described above in regards to method 1000.

At block 1102, the processing device may obtain a first image of a patient at a first point in time. The first image may be a younger target image. The first image may be uploaded by a user using the computing device.

At block 1104, the processing device may obtain a second image of the patient at a second point in time. The second point in time may be subsequent to the first point in time. The second image may be a current representation of the patient (e.g., before image).

At block 1106, the processing device may apply the first image of the patient and the second image of the patient as input to one or more machine learning models trained to output one or more suggested medical procedures to perform to modify an appearance of the patient in the second image to appear similar to an appearance of the patient in the first image. For example, the one or more machine learning models may recommend any suitable number of medical procedures that may cause the appearance of the patient in the second image to appear similar to an appearance of the patient in the first image.

At block 1108, the processing device may apply the one or more suggested medical procedures and the second image of the patient as input to the one or more machine learning models trained to output a predicted image of the patient that results from performing the one or more medical procedures on the appearance of the patient in the second image.

At block 1110, the processing device may present the one or more suggested medical procedures and the predicted image of the patient on a display. The predicted image may be presented in three-dimensions, augmented reality, and/or virtual reality. In some embodiments, presenting the predicted image of the patient on the display may include presenting a set of predicted images of the patient over a timeline as the one or more suggested medical procedures are performed, where each of the set of predicted images corresponds to a point in time when a suggested medical procedure of the one or more suggested medical procedures is performed on the appearance of the patient in the second image.

In some embodiments, the processing device may apply the second image of the patient as input to the machine learning model trained to output an aged image of the patient that results from not performing the one or more medical procedures on the appearance of the patient in the second image. The processing device may present the aged image of the patient on the display.

In some embodiments, the processing device may receive a selection to change the one or more suggested medical procedures to obtain one or more modified medical procedures. The processing device may apply the one or more modified medical procedures and the predicted image of the patient as input to the machine learning model to output another predicted image of the patient that results from performing the one or more modified medical procedures on an appearance of the patient in the predicted image. The processing device may present the one or more modified medical procedures and the another predicted image of the patient on the display.

Figure 12:
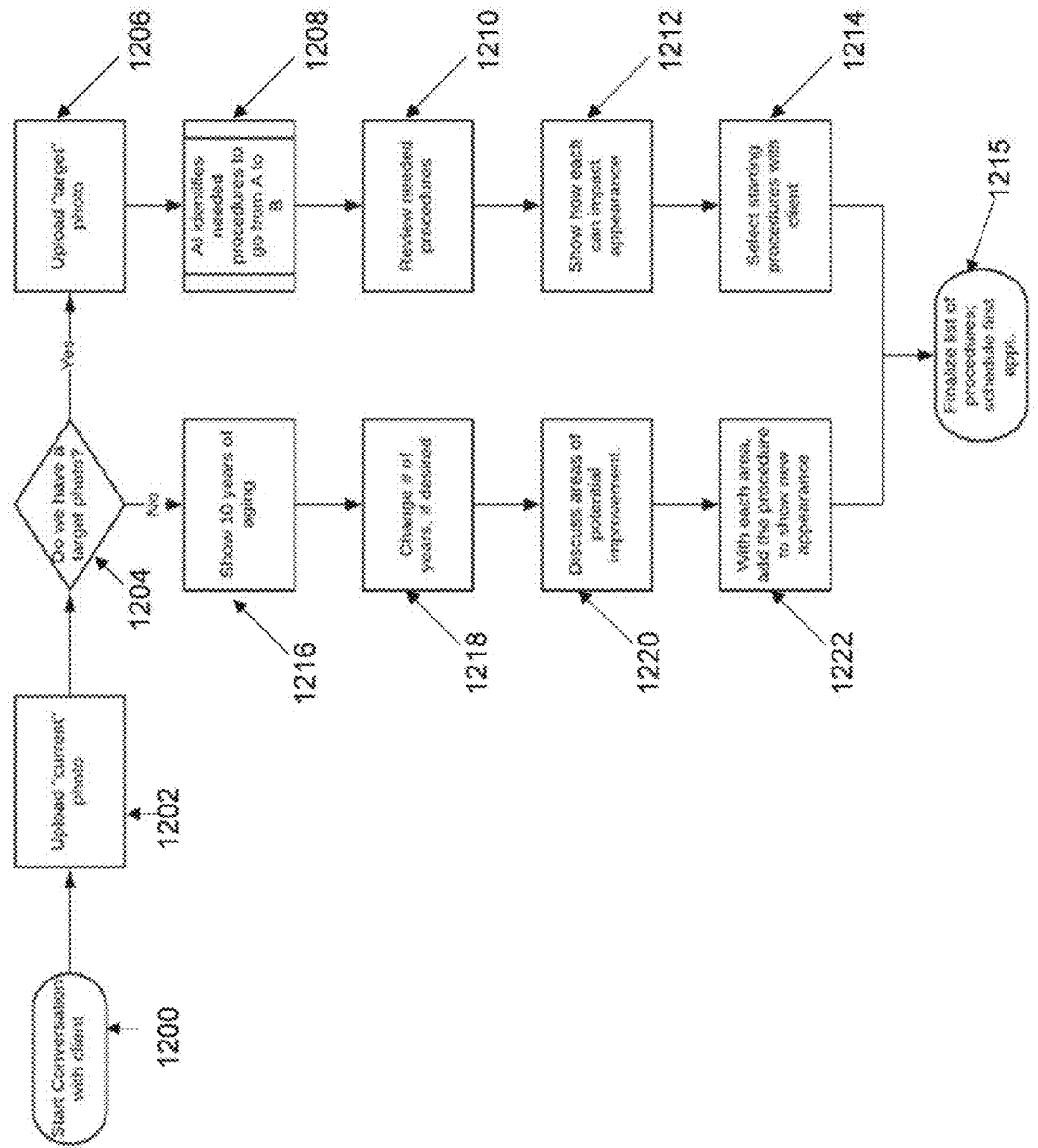
FIG. 12 illustrates example operations of a method for patient interaction with the patient visualization application according to certain embodiments of this disclosure.

FIG. 12 illustrates example operations of a method 1200 for patient interaction with the patient visualization application according to certain embodiments of this disclosure. Method 1200 includes operations performed by processing devices of the computing device 102 and/or the training engine 104 of FIG. 1. One or more operations of the method 1200 may be implemented as computer instructions that, when executed by a processing device, execute the patient visualization application and/or the machine learning models. The method 1200 may be performed in the same or a similar manner as described above in regards to method 1000.

To begin the visualization process, a clinician and patient may discuss (block 1200) the medical procedures to potentially perform on the patient. At block 1202, a processing device may prompt the clinician to upload or obtain a current image of the patient. The current image may be captured using an imaging device of the computing device. At block 1204, a determination is made by the processing device whether a target image is available (e.g., stored on a memory device of the computing device).

If a target image is provided or available (block 1206), the processing device analyzes the current image and the target image to identify (block 1208) which medical procedures to perform to cause the appearance of the patient in the current image to resemble the appearance of the patient in the target image. For example, one or more machine learning models may be used to identify the one or more medical procedures to perform on the patient. The processing device may present (block 1210) the suggested medical procedures on a display of the user interface. Further, the one or more machine models may generate a predicted modified image of the patient that results from performing the one or more medical procedures. The predicted modified image may be presented (block 1212) on a display of the computing device. The impact of the individual or cumulative medical procedures may be displayed over a timeline to show the progression. Further, suggested medical procedures may be deselected and their effect may be removed from the predicted modified image generated by the one or more machine learning models. At block 1214, the desired medical procedures may be selected and/or prioritized. At block 1215, the desired medical procedures may be finalized and an appointment may be scheduled to perform the medical procedures.

If a target image is not provided or available (block 1216), the processing device may generate (block 1216) a future image (e.g., by aging the current image a preset number of years) of the patient. The user may be prompted to select a target aging timeline for evaluation. One or more machine learning models may present a range of possible outcomes at the selected timeline. For example, the one or more machine learning models may provide a list of recommended medical procedures and the patient and/or clinician may toggle through the various medical procedures to view the generated predicted modified images of the patient. The patient and/or clinician may change (block 1218) the number of years, if desired. The medical procedures may be selected and assessed (block 1220) by subject area, or overall. With each area of improvement recommended by the one or more machine learning models, the effects of the medical procedures may be added to show the new appearance of the patient in one or more predicted modified images. A finalized list of medical procedures may be generated. The finalized list of selected procedures may be used (block 1215) to establish the order and schedule for medical procedures, consultations, etc. as well as generate specific predicted images of the patient including representations of the patient if the selected medical procedures are performed.

In some embodiments, the patient visualization application 110 may be preloaded on a dedicated smart device (e.g., computing device 110), such as a mobile device, for image capture and display of advanced visualizations of medical procedures. The mobile device may be provided with software, security technology, and instructional guide together as a complete package for the clinician.

Embodiments of the present disclosure may also extend to computer program products for analyzing digital imagery data. Such computer program products may be intended for executing computer-executable instructions upon computer processors in order to perform methods for analyzing digital data. Such computer program products may include computer-readable media which have computer-executable instructions encoded thereon where the computer-executable instructions, when executed by a suitable processor within a suitable computer environment, perform methods of analyzing digital data as further described here.

Embodiments may include one or more machine learning models that are produced and trained by a training engine. The one or more machine learning models may include various neural networks as described above. The patient visualization application may leverage the output of the machine learning models to present predicted modified images of the patient. The machine learning models may be trained with training data including before and after images of patients who have received a wide variety of medical procedures. Using learning based on the before and after images, the machine learning models are able, with a high degree of accuracy, to predict the after image of a patient given a before image and one or more selected medical procedures. Similarly, the machine learning models may, given a younger target image of a younger representation of the patient, recommend both a course of treatment and a predicted after image after such treatment is performed. Further, the machine learning models may be trained on specific name-brand products (e.g., Cool Sculpting) such that patients can compare the efficacy and outcome of different products even when such are similar procedures. Further, the machine learning models may be trained on the performance of specific physicians and medical organizations so that the guidance can be particularly accurate (e.g., not just a particular treatment, but rather a particular treatment by this particular doctor or in this medical spa).

Embodiments of the present disclosure may include or utilize a computer including computer hardware, such as, for example, one or more computer processors and data storage or system memory, as discussed in greater detail below. Embodiments within the scope of the present disclosure may also include physical and other computer-readable media for carrying or storing computer-executable instructions and/or data structures. Such computer-readable media may be any available media that can be accessed by a computer system. Computer-readable media that store computer-executable instructions are computer storage media. Computer-readable media that carry computer-executable instructions are transmission media. Thus, by way of example, and not limitation, embodiments of the disclosure may include at least two distinctly different kinds of computer-readable media: computer storage media and transmission media.

Computer storage media includes random-access memory (RAM), read-only memory (ROM), electrically erasable programmable read-only memory (EEPROM), compact disc read-only memory (CD-ROM), flash memory, or other optical disk storage, magnetic disk storage or other magnetic storage devices, or any other physical medium, which may be used to store desired program code in the form of computer-executable instructions or data structures and which may be accessed by a processor. In some embodiments, the computer storage media that stores desired program code may be included in cloud-based storage, such as on one or more servers.

A "network" is defined as one or more data links that enable the transport of electronic data between computer systems and/or modules and/or other electronic devices. When information is transferred or provided over a network or another communications connection (either hardwired, wireless, or a combination thereof) to a computer, the computer properly views the connection as a transmission medium. Transmission media can include a network and/or data links which can be used to carry or transmit desired program code in the form of computer-executable instructions and/or data structures, which may be received or accessed by a processor. Combinations of the above should also be included in the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface card (e.g., a "NIC"), and then eventually transferred to computer system RAM and/or to less volatile computer storage media at a computer system. Thus, it should be understood that computer storage media can be included in computer system components that also make use of transmission media.

Computer-executable instructions comprise, for example, instructions and data which, when executed at a processor, cause the processor or processing device to perform a certain function or group of functions. The computer executable instructions may be, for example, binaries which may be executed directly upon a processor, intermediate format instructions such as assembly language, or even higher-level source code which may require compilation by a compiler targeted toward a particular machine or processor. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

The techniques may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The techniques may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 13:
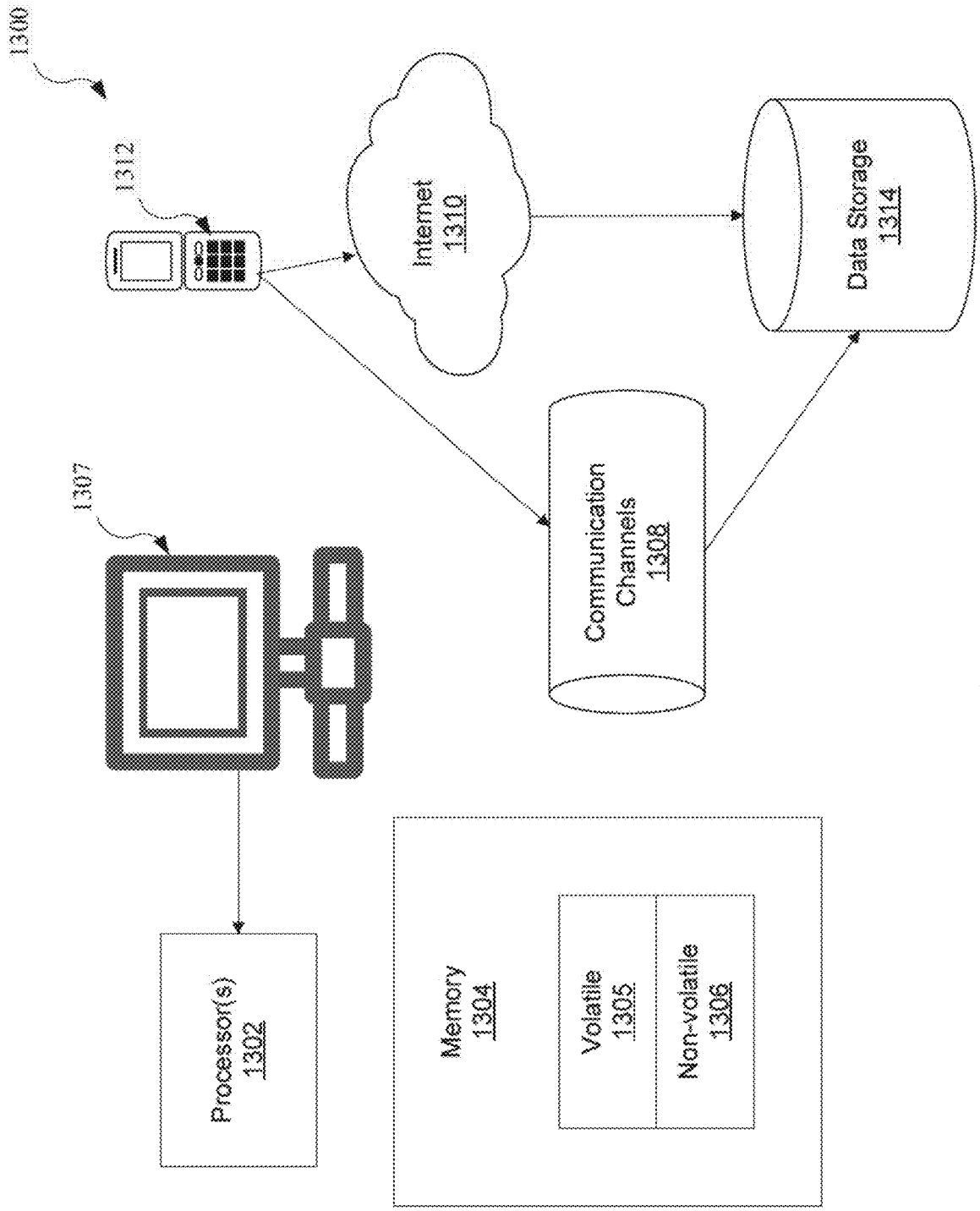
FIG. 13 illustrates a networked computer system for collecting, processing and displaying imagery and other data useful in the patient visualization application.

FIG. 13 illustrates a computer architecture 1300 for collecting, processing and displaying imagery and other data useful in the patient visualization application. Computer architecture 1300, also referred to herein as a computer system 1300, includes one or more processing devices (e.g., computer processors) 1302 and data storage. Computing system 1300 may be any device (e.g., computing device 102, the training engine 104, etc.) described in FIG. 1. Although the various components are depicted separately from one another, it should be understood that one or more of the components in the computing system 1300 may be communicatively coupled within the same device or different devices. Data storage may be memory 1304 within the computing system 1300 and may be volatile 1305 (RAM) or non-volatile 1306 (ROM, flash) memory. The memory 1304 may store computer instructions for performing the methods described herein. The computer instructions may implement the patient visualization application 110 and/or the one or more machine learning models 106 of FIG. 1. The computer instructions may be executed by the one or more processing device 1302.

Computing system 1300 may also comprise a display 1307 for display of data or other information. Computing system 1300 may also contain communication channels 1308 that allow the computing system 1300 to communicate with other computing systems, devices, or data sources over, for example, a network (such as perhaps the Internet 1310). Computing system 1300 may also comprise a smart phone, tablet or other input device, such as an imaging device 1312, which allows a source of digital or analog data to be accessed. Such digital or analog data may, for example, be photo or video data. Digital or analog data may be in the form of real time streaming data, such as from a live camera, or may be stored data accessed from data storage 1314 which is accessible directly by the computing system 1300 or may be more remotely accessed through communication channels 1308 or via a network such as the Internet 1310.

Communication channels 1308 are examples of transmission media. Transmission media typically embody computer-readable instructions, data structures, program modules, or other data in a modulated data signal such as a carrier wave or other transport mechanism and include any information-delivery media. By way of example, and not limitation, transmission media include wired media, such as wired networks and direct-wired connections, and wireless media such as acoustic, radio, infrared, and other wireless media. The term "computer-readable media" as used herein includes both computer storage media and transmission media.

Embodiments within the scope of the present disclosure also include computer-readable media for carrying or having computer-executable instructions or data structures stored thereon. Such physical computer-readable media, termed "computer storage media," can be any available physical media that can be accessed by a computer. By way of example, and not limitation, such computer-readable media can comprise physical storage and/or memory media such as RAM, ROM, EEPROM, CD-ROM or other optical disk storage, magnetic disk storage or other magnetic storage devices, or any other physical medium which can be used to store desired program code in the form of computer-executable instructions or data structures and which can be accessed by a general purpose or special purpose computer. In some embodiments, the computer-readable media may be included in cloud-based storage systems, such as on one or more servers.

Computer systems may be connected to one another over (or are part of) a network, such as, for example, a Local Area Network ("LAN"), a Wide Area Network ("WAN"), a Wireless Wide Area Network ("WWAN"), and even the Internet 1310. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Accordingly, the present techniques provide an AI assisted advanced patient visualization application to assist clinicians and patient preview and plan medical procedures. Various alternative embodiments may include trained graphic designers that mock up images based on prior before-and-after images.

Similarly, while the present techniques have been described herein as a system and method for visualization of medical procedures, the present techniques may be readily used for visualization of cosmetic make-up outcomes, or of any number of other procedures now known or hereafter developed.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method, comprising:
uploading a first image of a patient at a first point in time, wherein the first image includes a younger target appearance of the patient;
uploading a second image of the patient at a second point in time, wherein the second point in time is subsequent to the first point in time and the second image includes a current appearance of the patient;
applying the first image of the patient and the second image of the patient as input to a trained machine learning model to output one or more suggested medical procedures to perform to cause one or more features of the current appearance of the patient in the second image to appear visually similar to the younger target appearance of the patient in the first image;
generating a modified image of the patient by applying the one or more suggested medical procedures and the second image of the patient as input to a second trained machine learning model, wherein the modified image of the patient comprises the one or more features that are visually similar to the younger target appearance of a body region of the patient in the first image that results from performing the one or more suggested medical procedures on the current appearance of the patient in the second image; and
presenting the one or more suggested medical procedures and the modified image of the patient on a display.

2. The method of claim 1, further comprising:
receiving a selection to change the one or more suggested medical procedures to obtain one or more modified medical procedures;
generating another modified image of the patient by applying the one or more modified medical procedures and the predicted image of the patient as input to the second trained machine learning model that results from performing the one or more modified medical procedures on an appearance of the patient in the predicted modified image; and
presenting the one or more modified medical procedures and the another modified image of the patient on the display.

3. The method of claim 1, wherein presenting the modified image of the patient on the display comprises:
presenting a plurality of modified images of the patient over a timeline as the one or more suggested medical procedures are performed, wherein each of the plurality of modified images corresponds to a point in time when a suggested medical procedure of the one or more suggested medical procedures is performed on the appearance of the patient in the second image.

4. The method of claim 1, further comprising:
applying the second image of the patient as input to a third trained machine learning model to output an aged image of the patient that results from not performing the one or more suggested medical procedures on the appearance of the patient in the second image; and
presenting the aged image of the patient on the display.

5. The method of claim 1, wherein presenting the modified image of the patient on the display comprises presenting the predicted modified image of the patient in three-dimensions or augmented reality.

6. A tangible, non-transitory computer-readable medium storing instructions that, when executed, cause a processing device to:
upload a first image of a patient, wherein the first image includes a younger target appearance of the patient;
upload, a second image of the patient, wherein the second image includes a current appearance of the patient;
apply the first image of the patient and the second image of the patient as input to a trained machine learning model to output one or more suggested medical proceduresto perform to cause one or more features of the current appearance of the patient in the second image to appear visually similar to the younger target appearance of the patient in the first image;
generate a modified image of the patient by applying the one or more suggested medical procedures and the second image of the patient as input to a second trained machine learning model, wherein the modified image of the patient comprises the one or more features that are visually similar to the younger target appearance of a body region of the patient in the first image that results from performing the one or more suggested medical procedures on the current appearance of the patient in the second image; and
present the one or more suggested medical procedures and the modified image of the patient on a display.

7. The computer-readable medium of claim 6, wherein the processing device uploads the second image of the patient using an imaging device by:

receiving a selection of the body region on which to perform the one or more suggested medical procedures; and adjusting one or more image parameters comprising at least one of lighting, shading, orientation, depth of focus, or zoom based on an environment in which the patient is located.

8. The computer-readable medium of claim 7, wherein the processing device is further to:

provide one or more graphical guide indicators on the display to enable positioning the body region of the patient within a certain image capture area of the imaging device;

determine whether the body region is positioned within the certain image capture area of the imaging device; and responsive to determining that the target body region is positioned within the certain image capture area of the imaging device, capturing the image of the body region of the patient within the certain image capture area using the one or more image parameters.

9. The computer-readable medium of claim 6 wherein the processing device is further to:

train the machine learning model using a set of before images of a plurality of patients and a set of after images of the plurality of patients, wherein the before images of the plurality of patients comprise representations of the plurality of patients before the one or more suggested medical procedures are performed on the plurality of patients and the after images of the plurality of patients comprise representations of the plurality of patients after at least one of the one or more suggested medical procedures were performed on the plurality of patients.

10. The computer-readable medium of claim 6, wherein the processing device is further to:

present a graphical element that causes the modified image to be updated with subsequent medical procedures overtime as the graphical element is selected.

11. The computer-readable medium of claim 6, wherein the processing device is further to:

generate a plurality of modified images of the patient that represent an appearance of the patient as each of the one or more suggested medical procedures are performed over a time series.

12. The computer-readable medium of claim 6, wherein presenting the modified image of the patient on the display comprises presenting the modified image of the patient in augmented reality on the computing device comprising the display or in virtual reality in a headset.

13. A system comprising:
a memory device storing instructions;
a processing device communicatively coupled to the memory device, the processing device to execute the instructions to:

upload a first image of a patient, wherein the first image includes a younger target appearance of the patient;

upload, a second image of the patient, wherein the second image includes a current appearance of the patient;

apply the first image of the patient and the second image of the patient as input to a trained machine learning model to output one or more suggested medical procedures to perform to cause one or more features of the current appearance of the patient in the second image to appear visually similar to the younger target appearance of the patient in the first image;

generate a modified image of the patient by applying the one or more suggested medical procedures and the second image of the patient as input to a second trained machine learning model, wherein the modified image of the patient comprises the one or more features that are visually similar to the younger target appearance of a body region of the patient in the first image that results from performing the one or more suggested medical procedures on the current appearance of the patient in the second image; and present the one or more suggested medical procedures and the modified image of the patient on the display.

14. The system of claim 13, wherein the processing device is further to upload the second image of the patient using an imaging device, the processing device is further to:

receive a selection of the body region on which to perform the one or more suggested medical procedures; and adjust one or more image parameters comprising at least one of lighting, shading, orientation, depth of focus, or zoom based on an environment in which the patient is located provide one or more graphical guide indicators on the display to enable positioning the body region of the patient within a certain image capture area of the imaging device;

determine whether the body region is positioned within the certain image capture area of the imaging device; and responsive to determining that the body region is positioned within the certain image capture area of the imaging device, obtain the image of the body region of the patient within the certain image capture area using the one or more image parameters.

15. The system of claim 13, wherein the processing device is further to:

train the machine learning model using a set of before images of a plurality of patients and a set of afterimages of the plurality of patients, wherein the before images of the plurality of patients comprise representations of the plurality of patients before the one or more suggested medical procedures are performed on the patient and the after images of the plurality of patients comprise representations of the plurality of patients after at least one of the one or more suggested medical procedures were performed on the plurality of patients.

16. The system of claim 13, wherein the processing device is further to:

present a graphical element that causes the modified image to be updated with subsequent medical procedures over time as the graphical element is selected.

17. The system of claim 13, wherein the processing device is further to:

generate a plurality of modified images of the patient that represent an appearance of the patient as each of the one or more suggested medical procedures are performed over a time series.

18. The system of claim 13, wherein to present the modified image of the patient on the display, the processing device is further to present the modified image of the patient in augmented reality using a mobile device comprising the display or in virtual reality using a headset.

* * * * *